(12) United States Patent
Kozicki et al.

(10) Patent No.: US 10,710,070 B2
(45) Date of Patent: Jul. 14, 2020

(54) LOW-VOLTAGE MICROFLUIDIC VALVE DEVICE AND SYSTEM FOR REGULATING THE FLOW OF FLUID

(71) Applicant: ARIZONA BOARD OF REGENTS ON BEHALF OF ARIZONA STATE UNIVERSITY, Scottsdale, AZ (US)

(72) Inventors: Michael N. Kozicki, Phoenix, AZ (US); Junseok Chae, Scottsdale, AZ (US)

(73) Assignee: ARIZONA BOARD OF REGENTS ON BEHALF OF ARIZONA STATE UNIVERSITY, Scottsdale, AZ (US)

( * ) Notice: Subject to any disclaimer, the term of this patent is extended or adjusted under 35 U.S.C. 154(b) by 24 days.

(21) Appl. No.: 15/774,440

(22) PCT Filed: Nov. 22, 2016

(86) PCT No.: PCT/US2016/063290
§ 371 (c)(1),
(2) Date: May 8, 2018

(87) PCT Pub. No.: WO2017/091560
PCT Pub. Date: Jun. 1, 2017

(65) Prior Publication Data
US 2019/0291107 A1    Sep. 26, 2019

Related U.S. Application Data

(60) Provisional application No. 62/259,249, filed on Nov. 24, 2015.

(51) Int. Cl.
*B01L 3/00* (2006.01)
*F16K 99/00* (2006.01)
*F04B 43/04* (2006.01)

(52) U.S. Cl.
CPC ........ *B01L 3/502738* (2013.01); *F04B 43/04* (2013.01); *F04B 43/043* (2013.01);
(Continued)

(58) Field of Classification Search
CPC ....... B01L 3/502738; B01L 2300/0645; B01L 2300/12; B01L 2300/123; B01L 2300/165;
(Continued)

(56) References Cited

U.S. PATENT DOCUMENTS 4,904,338 A   2/1990   Kozicki
5,314,772 A   5/1994   Kozicki et al.
(Continued)

FOREIGN PATENT DOCUMENTS

WO   1997048032 A2   12/1997
WO   1997048032 A8   12/1997
(Continued)

OTHER PUBLICATIONS

Castle, Patrick J., and Paul W. Bohn. "Interfacial scattering at electrochemically fabricated atom-scale junctions between thin gold film electrodes in a microfluidic channel." Analytical chemistry 77.1 (2005): 243-249.*

(Continued)

*Primary Examiner* — Robert J Eom
(74) *Attorney, Agent, or Firm* — Michael Best & Friedrich LLP

(57) ABSTRACT

A low-voltage microfluidic valve device and system for regulating the flow of fluid. One low-voltage microfluidic valve device for regulating the low of fluid includes a nano-textured dendritic metallic filament configured to grow and retract in response to a voltage. The low-voltage microfluidic valve device also includes a microfluidic channel configured to allow fluid flow, wherein the fluid flow is (Continued)

selectively interrupted by the growth of the nano-textured dendritic metallic filament. The low-voltage microfluidic valve device also includes a membrane positioned proximate to the fluid and configured to alter shape in response to the growth of the nano-textured dendritic metallic filament.

10 Claims, 18 Drawing Sheets

(52) U.S. Cl.
CPC ...... *F16K 99/0026* (2013.01); *F16K 99/0042* (2013.01); *B01L 2300/0645* (2013.01); *B01L 2300/12* (2013.01); *B01L 2300/123* (2013.01); *B01L 2300/165* (2013.01); *B01L 2400/0415* (2013.01); *B01L 2400/0633* (2013.01); *B01L 2400/086* (2013.01); *F16K 2099/0074* (2013.01); *F16K 2099/0084* (2013.01)

(58) Field of Classification Search
CPC ..... B01L 2400/0415; B01L 2400/0633; B01L 2400/086; F04B 43/04; F04B 43/043; F16K 99/0026; F16K 99/0042; F16K 2099/0074; F16K 2099/0084
See application file for complete search history.

(56) References Cited

U.S. PATENT DOCUMENTS

| | | |
|---|---|---|
| 5,388,324 A | 2/1995 | Kozaki |
| 5,761,115 A | 6/1998 | Kozicki et al. |
| 5,896,312 A | 4/1999 | Kozicki et al. |
| 5,914,893 A | 6/1999 | Kozicki et al. |
| 6,084,796 A | 7/2000 | Kozicki et al. |
| 6,418,049 B1 | 7/2002 | Kozicki et al. |
| 6,469,364 B1 | 10/2002 | Kozicki |
| 6,487,106 B1 | 11/2002 | Kozicki |
| 6,635,914 B2 | 10/2003 | Kozicki et al. |
| 6,798,692 B2 | 9/2004 | Kozicki et al. |
| 6,825,489 B2 | 11/2004 | Kozicki |
| 6,914,802 B2 | 7/2005 | Kozicki |
| 6,927,411 B2 | 8/2005 | Kozicki |
| 6,940,745 B2 | 9/2005 | Kozicki |
| 6,985,378 B2 | 1/2006 | Kozicki |
| 6,998,312 B2 | 2/2006 | Kozicki et al. |
| 7,006,376 B2 | 2/2006 | Kozicki |
| 7,101,728 B2 | 9/2006 | Kozicki et al. |
| 7,142,450 B2 | 11/2006 | Kozicki et al. |
| 7,145,794 B2 | 12/2006 | Kozicki |
| 7,169,635 B2 | 1/2007 | Kozicki |
| 7,180,104 B2 | 2/2007 | Kozicki |
| 7,227,169 B2 | 6/2007 | Kozicki |
| 7,288,781 B2 | 10/2007 | Kozicki |
| 7,372,065 B2 | 5/2008 | Kozicki et al. |
| 7,385,219 B2 | 6/2008 | Kozicki et al. |
| 7,405,967 B2 | 7/2008 | Kozicki et al. |
| 7,560,722 B2 | 7/2009 | Kozicki |
| 7,675,766 B2 | 3/2010 | Kozicki |
| 7,728,322 B2 | 6/2010 | Kozicki |
| 7,763,158 B2 | 7/2010 | Kozicki |
| 7,929,331 B2 | 4/2011 | Kozicki |
| 8,022,384 B2 | 9/2011 | Kozicki |
| 8,134,140 B2 | 3/2012 | Kozicki |
| 8,213,217 B2 | 7/2012 | Kozicki |
| 8,213,218 B2 | 7/2012 | Kozicki |
| 8,218,350 B2 | 7/2012 | Kozicki |
| 8,742,531 B2 | 6/2014 | Kozicki |
| 8,999,819 B2 | 4/2015 | Kozicki et al. |
| 9,773,141 B2 | 9/2017 | Kozicki |
| 9,836,633 B2 | 12/2017 | Kozicki |
| 10,074,000 B2 | 9/2018 | Kozicki |
| 10,223,567 B2 | 3/2019 | Kozicki |
| 10,467,447 B1 | 11/2019 | Kozicki |
| 10,558,172 B2 | 2/2020 | Kozicki |
| 2003/0107105 A1 | 6/2003 | Kozicki |
| 2004/0124407 A1 | 7/2004 | Kozicki et al. |
| 2005/0225413 A1 | 10/2005 | Kozicki et al. |
| 2006/0291364 A1 | 12/2006 | Kozicki |
| 2010/0216026 A1 | 8/2010 | Lopatin et al. |
| 2011/0254117 A1 | 10/2011 | Kozicki |
| 2013/0220413 A1 | 8/2013 | Kozicki et al. |
| 2013/0228821 A1 | 9/2013 | Kozicki et al. |
| 2015/0194545 A1 | 7/2015 | Kozicki et al. |
| 2018/0088059 A1 | 3/2018 | Kozicki |
| 2018/0286035 A1 | 10/2018 | Kozicki |
| 2019/0197265 A1 | 6/2019 | Kozicki |

FOREIGN PATENT DOCUMENTS

| | | |
|---|---|---|
| WO | 1999028914 A2 | 6/1999 |
| WO | 2000048196 A1 | 8/2000 |
| WO | 2000048196 A9 | 8/2000 |
| WO | 2002021542 A1 | 3/2002 |
| WO | 2002082452 A2 | 10/2002 |
| WO | 2002099517 A2 | 12/2002 |
| WO | 2003028098 A2 | 4/2003 |
| WO | 2003032392 A2 | 4/2003 |
| WO | 2003036735 A2 | 5/2003 |
| WO | 2003079463 A2 | 9/2003 |
| WO | M05083810 A2 | 9/2005 |
| WO | 2010077622 A1 | 7/2010 |
| WO | 2012065076 A1 | 5/2012 |
| WO | 2012065083 A1 | 5/2012 |
| WO | 2014/165047 A1 | 10/2014 |
| WO | 2014165148 A1 | 10/2014 |
| WO | 2016073910 A1 | 5/2016 |
| WO | 2017062425 A1 | 4/2017 |
| WO | 2018175973 A1 | 9/2018 |
| WO | 2018232402 A1 | 12/2018 |
| WO | 2019210129 A1 | 10/2019 |

OTHER PUBLICATIONS

Yang, Y., et al. "A Solid Electrolyte Valve for Micro/Nano-fluidics." Nanotechnology 2009: Biofuels, Renewable Energy, Coatings, Fluidics and Compact Modeling—2009 NSTI Nanotechnology Conference and Expo, NSTI-Nanotech 2009. 2009.*

International Search Report and Written Opinion received in International Application No. PCT/US2016/063290, dated Mar. 9, 2017 (11 pages).

Abate, A. R.; Agresti, J. J.; Weitz, D. A. Microfluidic sorting with high-speed single-layer membrane valves. Appl. Phys. Lett. 2010, 96, 203509.

Allain, M.; Berthier, J.; Basrour, S.; Pouteau, P. Electrically actuated sacrificial membranes for valving in microsystems. J. Micromech. Microeng. 2010, 20, 035006.

Au, A. K; Lai, H.; Utela, B. R.; Folch, A. Microvalves and micropumps for bioMEMS. Micromachines 2011. 2, 179-220.

Baek, J. Y.; Park, J. Y.; Ju, J. I.; Lee, T. S.; Lee, S. H. A pneumatically controllable flexible and polymeric microfluidic valve fabricated via in situ development. J. Micromech. Microeng. 2005, 15, 1015-1020.

Baroud, C. N.; Delville, J. P.; Gallaire, F.; Wunenburger, R. Thermocapillary valve for droplet production and sorting. Phys. Rev. E 2007, 75, 046302.

Beebe, D. J.; Moore, J. S.; Bauer, J. M.; Yu, Q.; Liu, R. H.; Devadoss, C.; Jo, B. H. Functional hydrogel structures for autonomous flow control inside microfluidic channels. Nature 2000, 404, 588-590.

Bhushan, B.; Nosonovsky, M. The rose petal effect and the modes of superhydrophobicity. Phil. Trans. R. Soc. A 2010, 368, 4713-4728.

Chang, F. M.; Hong, S.J.; Sheng, Y. J.; Tsao, H. K. High contact angle hysteresis of superhydrophobic surfaces: hydrophobic defects. Appl. Phys. Lett. 2009, 95, 064102.

Chen, J. M.; Huang, P. C.; Lin, M. G. Analysis and experiment of capillary valves for microfluidics on a rotating disk. Microfluid. Nanofluid. 2008, 4, 427-437.

(56) References Cited

OTHER PUBLICATIONS

Cooksey, G. A.; Sip, C. G.; Folch, A. A multi-purpose microfluidic perfusion system with combinatorial choice of inputs, mixtures, gradient patterns, and flow rates. Lab Chip 2009, 9, 417-426.
Feng, L.; Zhang, Y.; Xi, J.; Zhu, Y.; Wang, N.; Xia, F.; Jiang, L. Petal effect: a superhydrophobic state with high adhesive force. Langmuir 2008, 24, 4114-4119.
Futai, N.; Gu, W; Takayama, S. Rapid prototyping of microstructures with bell-shaped cross-sections and its application to deformation-based microfluidic valves. Adv. Mater. 2004, 16, 1320-1323.
G. Kamiadakis, A. Beskok, N. Aluru, Microflows and Nanoflows, Springer, Berlin, Germany 2005, p. 313.
Gorkin, R; Park, J.; Siegrist, J.; Amasia, M.; Lee, B. S.; Park, J. M.; Kim, J.; Kim, H.; Madou, M.; Cho, Y. K Centrifugal microfluidics for biomedical applications. Lab Chip 2010, 10, 1758-1773.
Grover, W. H.; Skelley, A. M.; Liu, C. N.; Lagally, E. T.; Mathies, R. A. Monolithic membrane valves and diaphragm pumps for practical large-scale integration into glass microfluidic devices. Sens. Actuat. B 2003, 89, 315-323.
Gu, W.; Chen H.; Tung, Y.C.; Meiners, J.C.; Takayama, S. Multiplexed hydraulic valve actuation using ionic liquid filled soft channels and braille displays. Appl. Phys. Lett. 2007, 90, doi:10.1063/1.2431771.
H. Bruus, Theoretical Microfluidics, Oxford University Press, Oxford, England, 2008, p. 27.
H.A. Stone, in CMOS Biotechnology (Eds: H. Lee, R. M. Westervelt, D. Ham), Springer, Berlin, Germany 2007, p. 5.
Harrison, D. J.; Fluri, K; Seiler, K.; Fan, Z. H.; Effenhauser, C. S.; Manz, A. Micromachining a miniaturized capillary electrophoresis-based chemical-analysis system on a chip. Science 1993, 261, 895-897.
Hosokawa, K.; Fujii, T.; Endo, I. Handling of picoliter liquid samples in a poly(dimethylsiloxane)-based microfluidic device. Anal. Chem. 1999, 71, 4781-4785.
Hosokawa, K.; Maeda, R. A pneumatically-actuated three-way microvalve fabricated with polydimethylsiloxane using the membrane transfer technique. J. Micromech. Microeng. 2000, 10, 415-420.
International Preliminary Report on Patentability for Application No. PCT/US2016/063290 dated Jun. 7, 2018 (7 pages).
Irimia, D.; Liu, S. Y.; Tharp, W. G.; Samadani, A.; Toner, M.; Poznansky, M. C. Microfluidic system for measuring neutrophil migratory responses to fast switches of chemical gradients. Lab Chip 2006, 6, 191-198.
Irimia, D.; Toner, M. Cell handling using microstructured membranes. Lab Chip 2006, 6, 345-352.
Jacobson, S. C.; Ermakov, S. V.; Ramsey, J. M. Minimizing the number of voltage sources and fluid reservoirs for electrokinetic valving in microfluidic devices. Anal. Chem. 1999, 71, 3273-3276.
Kaigala, G. V.; Hoang, V. N.; Backhouse, C. J. Electrically controlled microvalves to integrate microchip polymerase chain reaction and capillary electrophoresis. Lab Chip 2008, 8, 1071-1078.
Kozicki, M. N.; Maroufkhani, P.; Mitkova, M. Flow regulation in microchannels via electrical alteration of surface properties. Superlattice. Microst. 2004, 34, 467-473.
Kozicki, M. N.; Maroufkhani, P.; Mitkova, M. Valving in microchannels via electrodeposition on solid electrolytes. Technical Proceedings of the 2005 NSTI Nanotechnology Conference 1, 716-719, 2005.
Lee, S. J.; Chan, J. C. Y.; Maung, K J.; Rezler, E; Sundararajan, N. Characterization of laterally deformable elastomer membranes for microfluidics. J. Micromech. Microeng. 2007, 17, 843-851.
Li, N.; Hsu, C. H.; Folch, A. Parallel mixing of photolithographically defined nanoliter volumes using elastomeric microvalve arrays. Electrophoresis 2005, 26, 3758-3764.
Liu, R. H.; Bonanno, J.; Yang, J. N.; Lenigk, R.; Grodzinski, P. Single-use, thermally actuated paraffin valves for microfluidic applications. Sens. Actuat. B 2004, 98, 328-336.
Maxwell, R. B.; Gerhardt, A. L.; Toner, M.; Gray, M. L.; Schmidt, M. A. A microbubble-powered bioparticle actuator. J. Microelectromech. Syst. 2003, 12, 630-640.
McDonald, J. C.; Whitesides, G. M. Poly(dimethylsiloxane) as a material for fabricating microfluidic devices. ACC. Chem. Res. 2002, 35, 491-499.
Mitkova, M. I.; Kozicki, M. N.; Aberouette, J. P. Morphology of electrochemical grown silver deposits on silver-saturated Ge-Se thin films. J. Non-Cryst. Solids 2003, 326&327, 425-429.
Mitkova, M.; Kozicki, M. N. Mass transport in chalcogenide electrolyte films—materials and applications. J. Non-Cryst. Solids 2006, 352, 567-577.
Moreno, J. M.; Quero, J. M. A novel single-use su-8 microvalve for pressure-driven microfluidic applications. J. Micromech. Microeng. 2010, 20, 015005.
Mosadegh, B.; Tavana, H.; Lesher-Perez, S. C.; Takayama, S. High-density fabrication of normally closed microfluidic valves by patterned deactivation of oxidized polydimethylsiloxane. Lab Chip 2011, 11, 738-742.
Nosonovsky, M. Model for solid-liquid and solid-solid friction of rough surfaces with adhesion hysteresis. J. Chem. Phys. 2007, 126, 224701.
Nosonovsky, M. Multiscale roughness and stability of superhydrophobic biomimetic interfaces. Langmuir 2007, 23, 3157-3161.
Nosonovsky, M.; Bhushan, B. Biomimetic superhydrophobic surface: multiscale approach. Nano Lett. 2007, 7, 2633-2637.
P. Tabeling, Introduction to Microfluidics, Oxford University Press, Oxford, England 2006, p. 32.
Pemble, C. M.; Towe, B. C. A miniature shape memory alloy pinch valve. Sens. Actuat. A 1999, 77, 145-148.
Santini, J. T.; Cima, M. J.; Langer, R. A controlled-release microchip. Nature 1999, 397, 335-338.
Schasfoort, R. B. M.; Schlautmann, S.; Hendrikse, L.; van den Berg, A. Field-effect flow control for microfabricated fluidic networks. Science 1999, 286, 942-945.
Studer, V.; Hang, G.; Pandolfi, A.; Ortiz, M.; Anderson, W. F.; Quake, S. R. Scaling properties of a low-actuation pressure microfluidic valve. J. Appl. Phys. 2004, 95, 393-398.
Sundararajan, N.; Kim, D.; Berlin, A. A. Microfluidic operations using deformable polymer membranes fabricated by single layer soft lithography. Lab Chip 2005, 5, 350-354.
Thorsen, T.; Maerkl, S. J.; Quake, S. R. Microfluidic large-scale integration. Science 2002, 298, 580-584.
Unger, M. A.; Chou, H. P.; Thorsen, T.; Scherer, A.; Quake, S. R. Monolithic microfabricated valves and pumps by multilayer soft lithography. Science 2000, 288, 113-116.
Wang et al., "A low-voltage microfluidic valve based upon a reversible hydrophobicity effect," Adv. Mater. Interfaces, 2016, 3:1600186.
Weibel, D. B.; Kruithof, M.; Potenta, S.; Sia, S. K.; Lee, A.; Whitesides, G. M. Torque-actuated valves for microlluidics. Anal. Chem. 2005, 77, 4726-4733.
Whitesides, G. M. The origins and future of microfluidics. Nature 2006, 422, 368-373.
Yang, B. Z.; Lin, Q. A latchable microvalve using phase change of paraffin wax. Sens. Actuat. A 2007, 134, 194-200.
Yu, Q.; Bauer, J. M.; Moore, J. S.; Beebe, D. J. Responsive biomimetic hydrogel valve for microfluidics. Appl. Phys. Lett. 2001, 78, 2589-2591.
U.S. Appl. No. 16/496,767, filed Sep. 23, 2019, Kozicki et al.
U.S. Appl. No. 16/621,989, filed Dec. 12, 2019, Kozicki.
U.S. Appl. No. 16/672,015, filed Nov. 1, 2019, Kozicki.

* cited by examiner

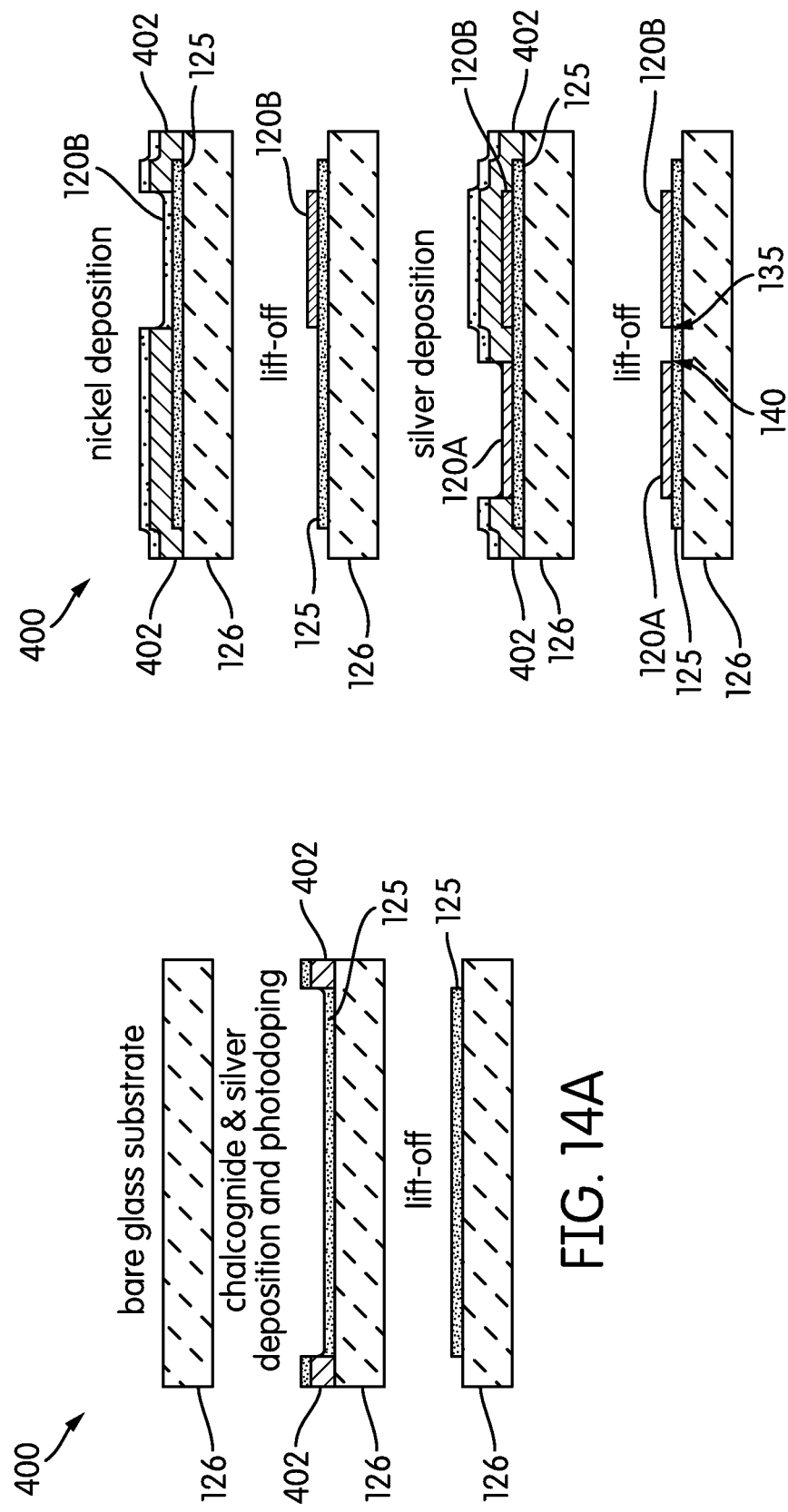

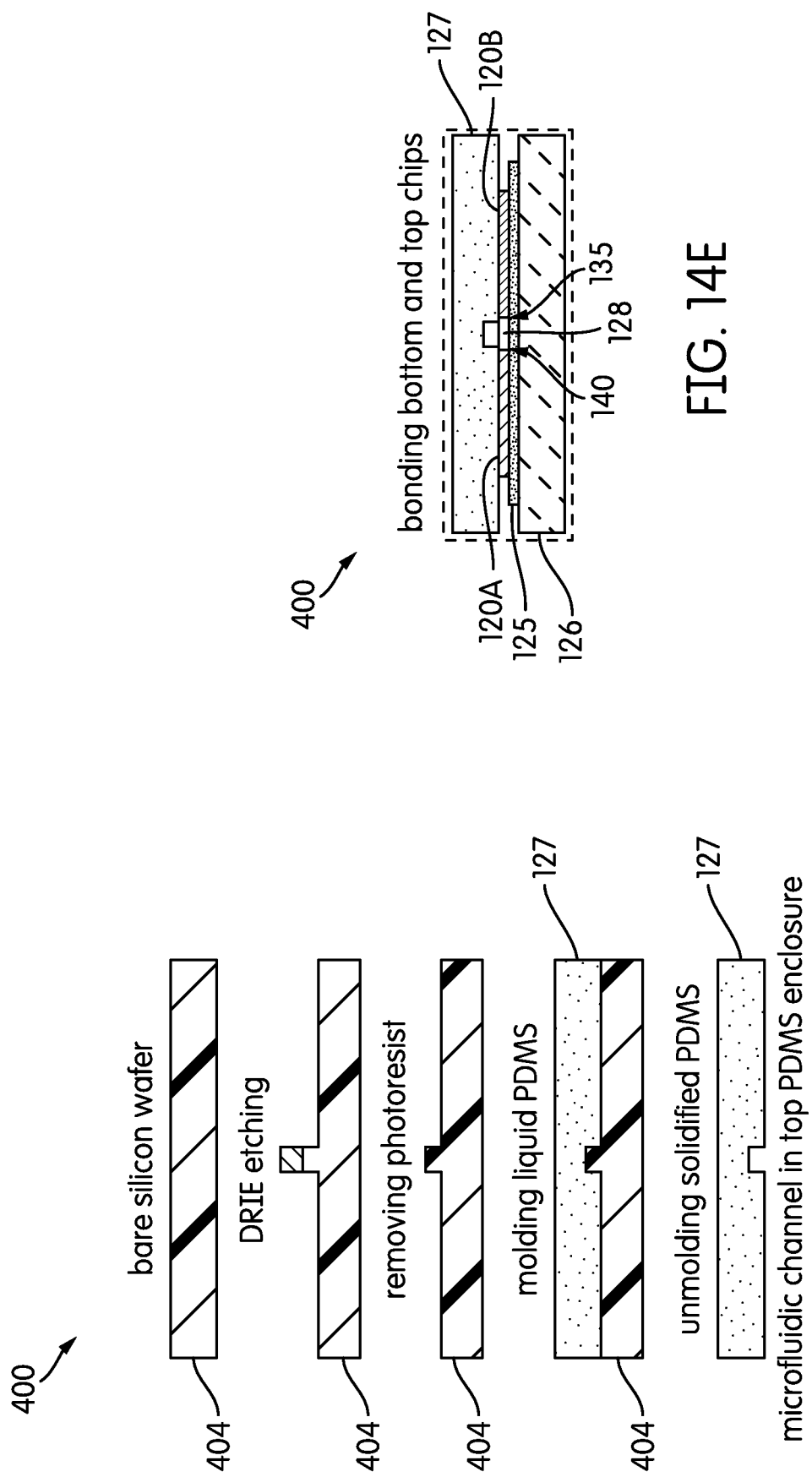

LOW-VOLTAGE MICROFLUIDIC VALVE DEVICE AND SYSTEM FOR REGULATING THE FLOW OF FLUID

RELATED APPLICATIONS

This application claims priority to U.S. Provisional Application No. 62/259,249 filed Nov. 24, 2015, the entire content of which is herein incorporated by reference.

FIELD

Embodiments of the invention relate to a low-voltage microfluidic valve device and system for regulating the flow of fluid, such as the flow of fluid through a microfluidic channel, based on a reversible petal effect.

BACKGROUND

The field of microfluidics has rapidly emerged and has been implemented in an array of applications, such as molecular analysis, bio-defense, molecular biology, micro-electronics, and the like. In the field of microfluidics, microvalves may be used to control the routing, the timing, and the separation of fluids in many different microfluidic systems.

Some microvalves deploy electrokinetic actuation to displace fluids from one microfluidic channel to another microfluidic channel. The mechanism of electrokinetic microvalves is simple. However, such electrokinetic microvalves demand a dielectric substrate, which is strongly influenced by the ionic composition of the fluid, high-voltage sources and switches, and a continuous buffer flow to enable microvalve functions. The next generation microvalves, such as Quake microvalves and plunger microvalves, are able to avoid cumbersome, high-voltage sources and switches. However, these microvalves generally rely on the deflection of a Poly(dimethylsiloxane) (PDMS) membrane to interrupt the flow of fluid. Due to the integration of the control channel within the microfluidics channel on the same PDMS chip, the device structures and fabrication may be complicated. Lateral-deflection membrane microvalves simplify the fabrication, but impose an intrinsic undesirable effect of leakage of the channel. Other "doormat" and "curtain" style microvalves inherently risk permanently bonding the microvalve closed during assembly. This risk may be mitigated by adding a non-PDMS valve seat, but the addition of a non-PDMS valve seat incurs the trade-off of fabrication complexity. Along with these aforementioned challenges, pneumatic microvalves also require external pneumatic elements. Other than these pneumatic microvalves, pinch microvalves directly exert mechanical force on the PDMS bulk that forms the device, which is straightforward, yet an ample distance between adjacent pinching points needs to be provided. Entirely different from microvalves controlled by physical forces, phase-change microvalves control the flow of fluid through a solid and fluidic phase modulation. However, these phase-change microvalves require an additional cooling or heating element. Additionally, the phase modulation of these phase-change microvalves induce a slow actuation of approximately 1 to 10 minutes. Noteworthy burst microvalves and bubble microvalves incorporate innovative actuations but are hard to control. Additionally, burst microvalves and bubble microvalves may contaminate the samples in the microfluidic channel.

SUMMARY

Embodiments of the invention relate to a microfluidic valve device based on a reversible petal effect via the growth and retraction of non-volatile nano-textured dendritic silver filaments on the surface of a solid electrolyte. A 6 volt bias is applied to grow or dissolve the filaments of tens to hundreds of nanometers in height, depending on the polarity. In some embodiments, the fluid flow in a PDMS-enclosed microfluidic channel of 25 μm in depth may be stopped and restarted within approximately 25 seconds.

One embodiment of the invention provides a low-voltage microfluidic valve device based upon a reversible petal effect for regulating the flow of fluid. The low-voltage microfluidic valve device includes a nano-textured dendritic metallic filament configured to grow and retract in response to a voltage. The low-voltage microfluidic valve device also includes a microfluidic channel configured to allow fluid flow, wherein the fluid flow is selectively interrupted by the growth of the nano-textured dendritic metallic filament. The low-voltage microfluidic valve device also includes a membrane positioned proximate to the fluid and configured to alter shape in response to the growth of the nano-textured dendritic metallic filament.

In another embodiment the invention provides a system of regulating the flow of fluid. The system includes a low-voltage microfluidic valve device. The low-voltage microfluidic valve device includes a first electrode and a second electrode opposite the first electrode. The low-voltage microfluidic valve device also includes a nano-textured dendritic metallic filament configured to grow and retract. The low-voltage microfluidic valve device also includes a microfluidic channel configured to allow fluid flow, wherein the fluid flow is selectively interrupted by the growth of the nano-textured dendritic metallic filament. The low-voltage microfluidic valve device also includes a membrane positioned proximate to the fluid and configured to alter shape in response to the growth of the nano-textured dendritic metallic filament. The system also includes a power supply. The power supply is configured to provide the voltage across the first electrode and the second electrode of the low-voltage microfluidic valve device.

Other aspects of the invention will become apparent by consideration of the detailed description and accompanying drawings.

BRIEF DESCRIPTION OF THE DRAWINGS

FIGS. 14A-14E are schematic diagrams illustrating a fabrication process of the microfluidic valve device of FIGS. 1A-1C.

DETAILED DESCRIPTION

Before any embodiments of the invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways.

Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and may include electrical connections or couplings, whether direct or indirect. Also, electronic communications and notifications may be performed using any known means including wired connections, wireless connections, etc.

It should also be noted that a plurality of hardware and software based devices, as well as a plurality of different structural components may be used to implement the invention. In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (for example, stored on non-transitory computer-readable medium) executable by one or more processors. As such, it should be noted that a plurality of hardware and software based devices, as well as a plurality of different structural components may be utilized to implement the invention. For example, "control units" and "controllers" described in the specification may include one or more electronic processors, one or more memory modules including non-transitory computer-readable medium, one or more input/output interfaces, and various connections (for example, a system bus) connecting the components.

Figure 1A:
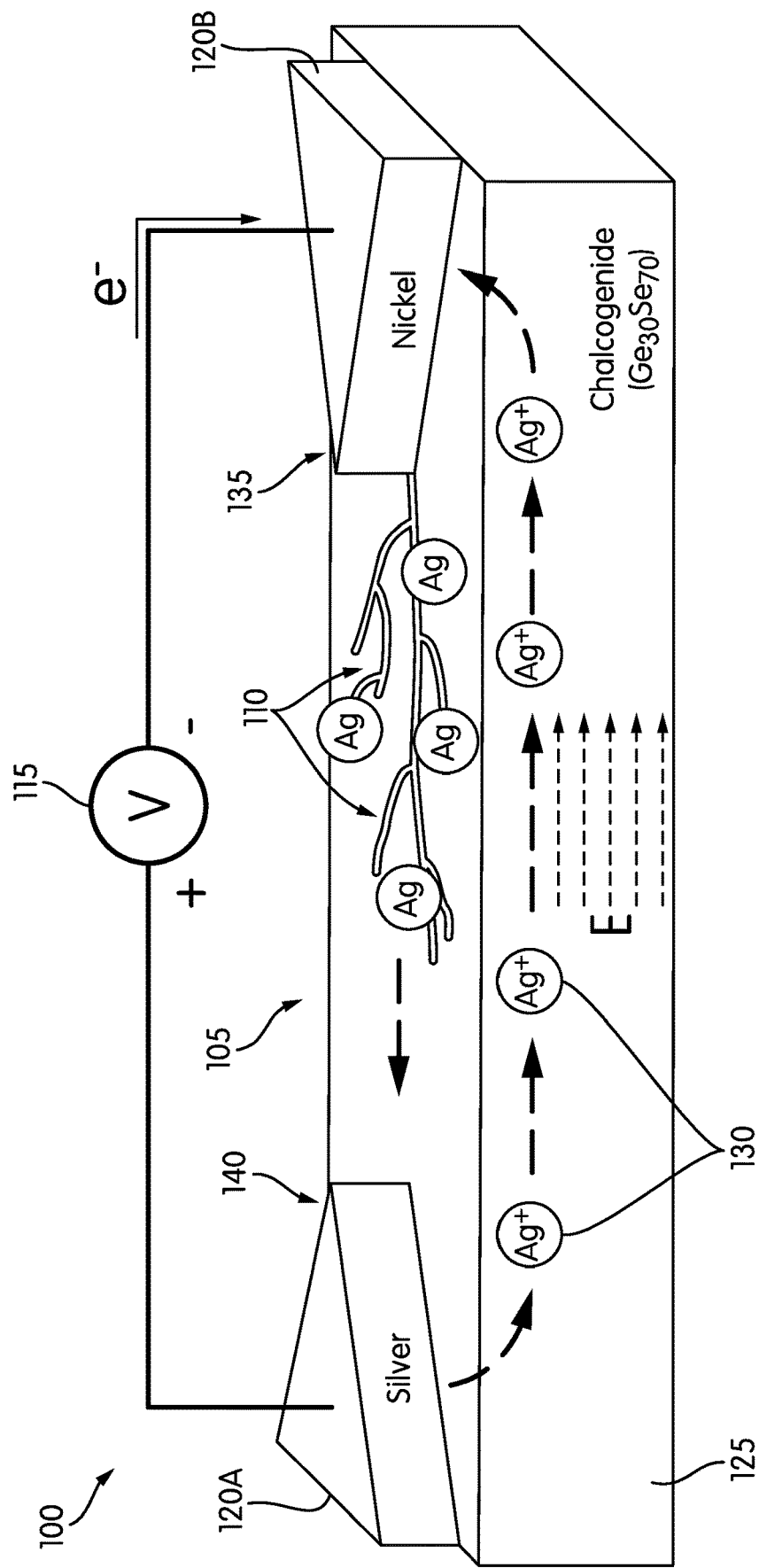
FIG. 1A is a perspective view of a schematic diagram of a microfluidic valve device illustrating the growth of a plurality of dendritic silver filaments on a chalcogenide solid electrolyte surface.
Figure 1B:
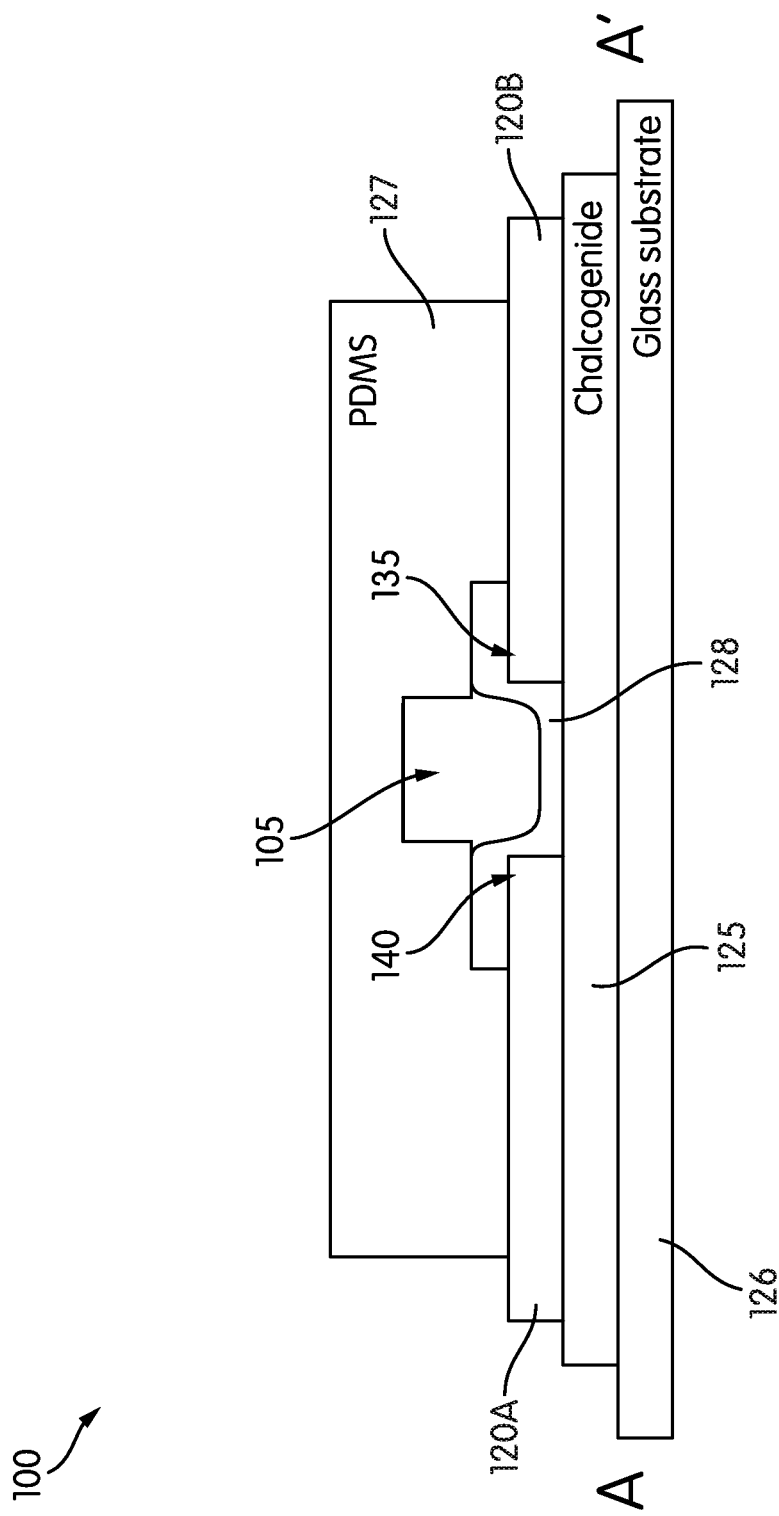
FIG. 1B is an elevation view of a schematic diagram of the microfluidic valve device of FIG. 1A.
Figure 1C:
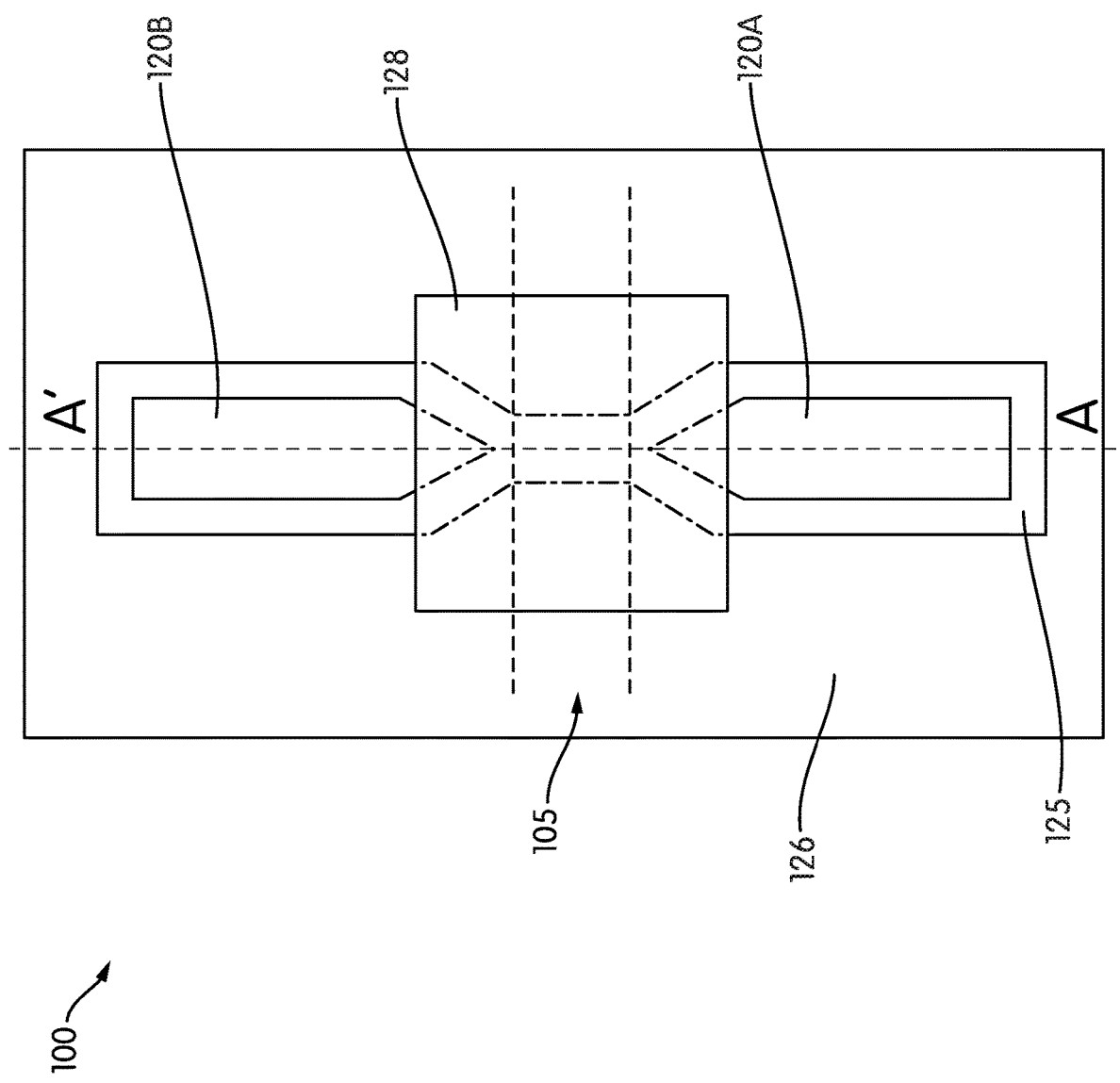
FIG. 1C is an overhead view of a schematic diagram of the microfluidic valve device of FIG. 1A.

FIGS. 1A-1C illustrate a microfluidic valve device 100 according to one embodiment. The microfluidic valve device 100 is configured to regulate the flow of fluid in a microfluidic channel 105. In particular, the microfluidic valve device 100 may regulate the flow of fluid via a growth or retraction of a plurality of nano-scale dendritic silver filaments 110 (hereinafter referred to as "the plurality of silver filaments 110"). The growth or retraction of the plurality of silver filaments 110 modify a dynamic characteristic at an interface between the fluid in the microfluidic channel 105 and a surface (for example, a chalcogenide solid electrolyte surface 125) of the microfluidic channel 105. Such a modification of the dynamic characteristic enables the regulation of the flow of fluid in the microfluidic channel 105.

Traditionally, a microfluidic channel is on a scale of 10 s or 100 s of μm in depth. However, the microfluidic valve device 100 may operate on a scale of 10 s or 100 s of nm in depth. Operating on such a small scale may stop the large-scale flow of fluid as the nano-structure of the microfluidic valve device 100 modifies the dynamic characteristic of the bottom surface of the microfluidic channel 105 (for example, a top surface of the chalcogenide solid electrolyte surface 125), which emulates the transition from a lotus effect to a petal effect. An adhesive force (in example, the force used to pin a fluid droplet) provided by the petal effect may be significantly stronger than the adhesive force provided by the lotus effect. Such an increase in adhesive force is a benefit of the specific rough topography on the petal surface. Additionally, the petal effect may provide hierarchical micro-structures and nano-structures, which significantly contribute to the adhesive force on a fluid droplet. The plurality of silver filaments 110 modulate the interface topography on the bottom surface of the microfluidic channel 105 and enhance roughness of the interface topography to interrupt the flow of fluid in a similar manner, which creates a functional nano-valve (in example, the microfluidic valve device 100). In some embodiments, the microfluidic valve device 100 controls the microfluidic flow of fluid through exertion on the interface of the flow rather than the whole bulk of the flow.

Instead of the cumbersome pneumatic elements and air tubing, the microfluidic valve device 100 may be actuated by a low direct current (DC) voltage, such as a DC voltage of less than or equal to 6 volts. Actuating the microfluidic valve device 100 with a low DC voltage allows the external actuating unit to be a simplified standard DC power supply 115, as illustrated in FIG. 1A. Unlike a pneumatically actuated device, where air may penetrate through a thin PDMS membrane and dissolve into the biological samples or the chemical samples in the microfluidic channel 105, the microfluidic valve device described herein is free from such contamination.

As illustrated in FIGS. 1A-1C, the microfluidic valve device 100 includes two electrodes, a silver electrode 120A and a nickel electrode 120B, positioned on the chalcogenide solid electrolyte surface 125. In some embodiments, as illustrated in FIGS. 1B-1C, the microfluidic valve device 100 includes a bottom glass substrate 126, a top PDMS enclosure 127 having the microfluidic channel 105, and a thin parylene film 128. The bottom glass substrate 126 may have the dimensions of 75×38×1 mm$^3$ while the top PDMS enclosure 127 may have a width of 250 μm and a depth of 25 μm. The parylene film 128 may be approximately 200 nm thick. When the plurality of silver filaments 110 grow, the plurality of silver filaments 110 may reside under the parylene film 128, as described in more detail below.

Figure 2:
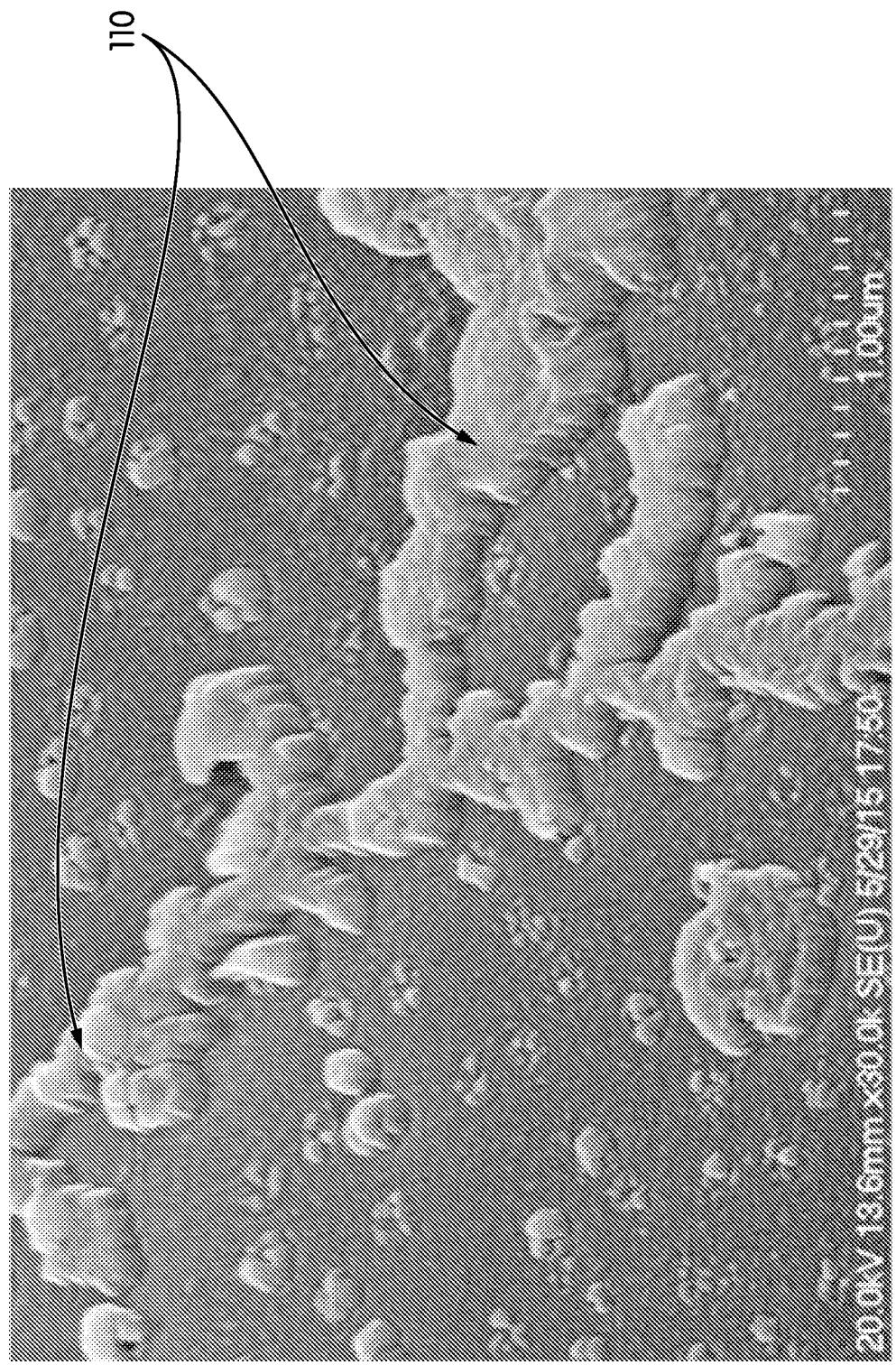
FIG. 2 is an optical profilometer image illustrating the morphology of the plurality of dendritic silver filaments of FIG. 1A.

When a positive DC voltage is applied (via the power supply 115) across the silver electrode 120A and the nickel electrode 120B, as illustrated in FIG. 1A, the silver electrode 120A functions as an anode electrode and the nickel electrode 120B functions as a cathode electrode. In response to the positive DC voltage, electrons are lost from the silver atoms 130 of the silver electrode 120A (in example, the anode electrode). As a result, the silver atoms 130 become positive silver ions 130. The positive silver ions 130, along with ions in the chalcogenide solid electrolyte surface 125, are driven forward, towards the nickel electrode 120B (in example, the cathode electrode), until the positive silver ions 130 encounter electrons provided by the nickel electrode 120B. When the positive silver ions 130 encounter the electrons provided by the nickel electrode 120B, the positive silver ions 130 change into silver atoms 130 and accumulate from a tip 135 of the nickel electrode 120B towards a tip 140 of the silver electrode 120A, forming the plurality of silver filaments 110 mentioned above. FIG. 2 is an image from an optical profilometry and scanning electron microscope (SEM). In particular, the image of FIG. 2 illustrates the morphology and surface roughness of the plurality of silver filaments 110. The height of individual filaments included in the plurality of silver filaments 110 may be within the range of 10 nm-300 nm while the width of individual filaments included in the plurality of silver filaments 110 may be within the range of 100 nm-5 μm.

When a negative DC voltage is applied (via the power supply 115) across the silver electrode 120A and the nickel electrode 120B (in example, the polarity of the supplied DC voltage is reversed), the silver electrode 120A functions as the cathode electrode and the nickel electrode 120B functions as the anode electrode. In response to the negative DC voltage, the silver atoms 130 in the plurality of silver filaments 110 become oxidized at the nickel electrode 120B. In other words, the silver atoms 130 return to their original ionic state (in example, silver ions 130). As a result, the silver ions 130 dissolve back into the chalcogenide solid electrolyte surface 125.

Figure 3A:
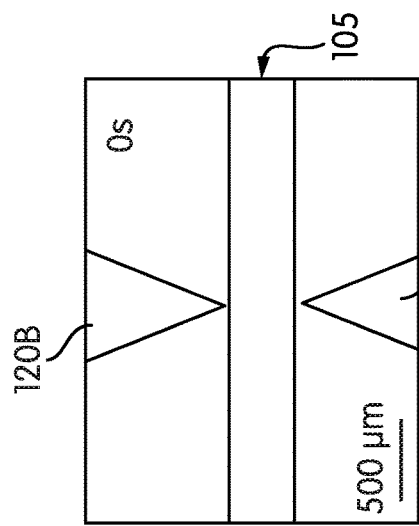
FIGS. 3A-3F are a series of images illustrating a growth-retraction process of the plurality of dendritic silver filaments of FIG. 1A.
Figure 3B:
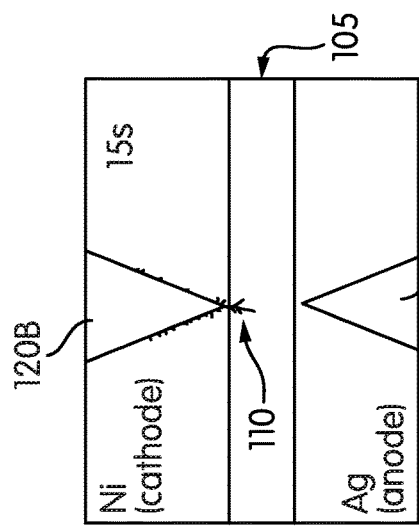
Figure 3C:
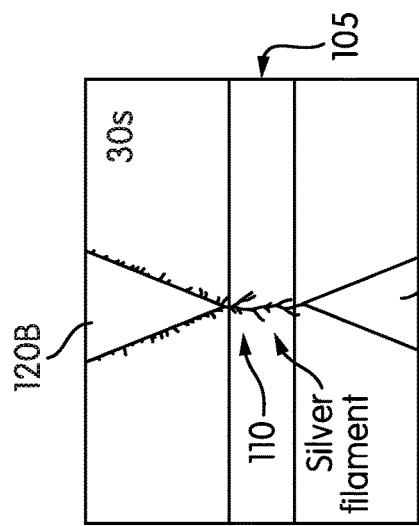
Figure 3D:
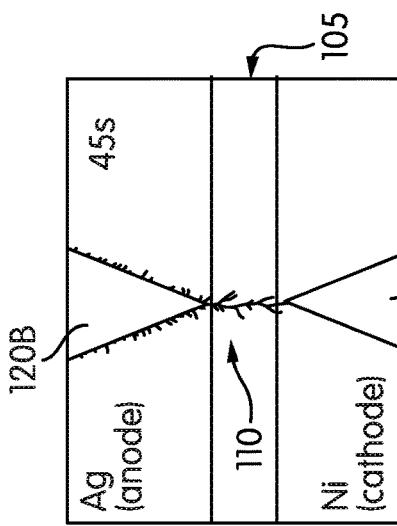
Figure 3E:
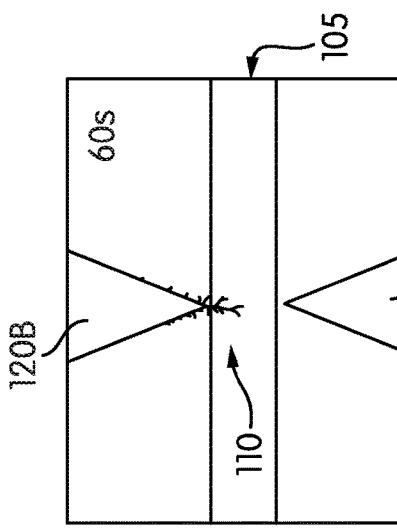
Figure 3F:
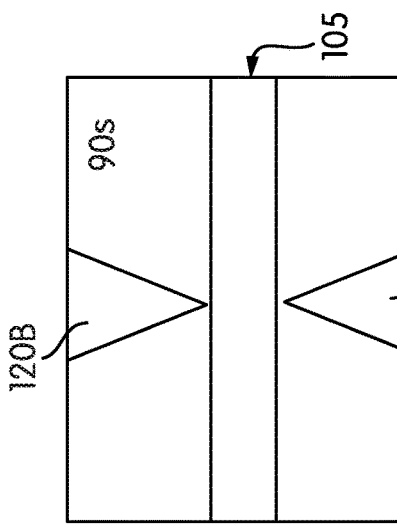

FIGS. 3A-3F illustrate the above described growth and retraction process. For example, FIG. 3A illustrates both the silver electrode 120A and the nickel electrode 120B prior to application of a DC voltage via the power supply 115 (at 0 seconds). After 15 seconds of applying a positive DC voltage via the power supply 115, the plurality of silver filaments 110 begins to grow between the silver electrode 120A (in example, the anode electrode) and the nickel electrode 120B (in example, the cathode electrode). FIG. 3C illustrates the growth of the plurality of silver filaments 110 after 30 seconds of applied positive DC voltage. FIG. 3D illustrates the retraction of the plurality of silver filaments 110 caused by the application of a negative DC voltage via the power supply 115 (at 45 seconds). FIG. 3E illustrates the continued retraction of the plurality of silver filaments 110 caused by the application of the negative DC voltage via the power supply 115 (at 60 seconds). At 90 seconds, the plurality of silver filaments 110 are fully retracted, as illustrated in FIG. 3F. As illustrated in FIGS. 3A-3F, the plurality of silver filaments 110 appear to retract along the original path of the plurality of silver filaments 110 from the tip 140 of the silver electrode 120A back to the tip 135 of the nickel electrode 120B.

Figure 4C:
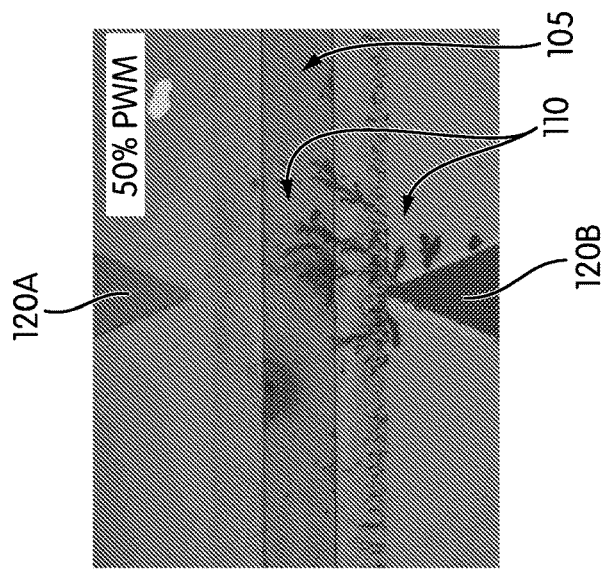
FIGS. 4B-4C are images of a plurality of dendritic silver filaments generated by pulse width modulation (PWM) of different duty cycles.
Figure 4B:
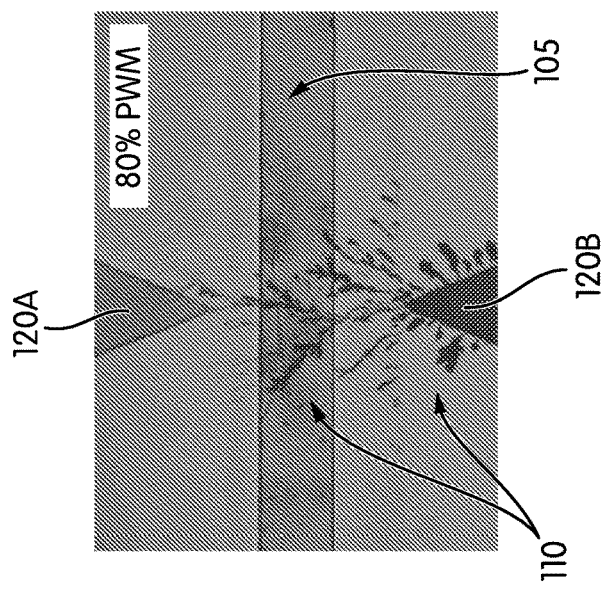
Figure 4A:
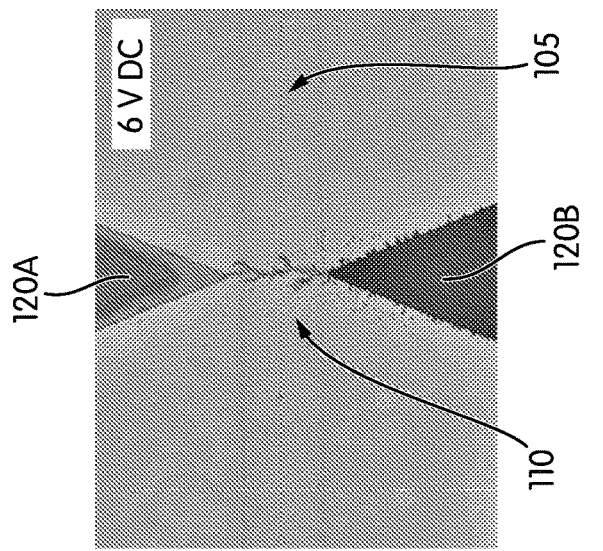
FIG. 4A is an image of a plurality of dendritic silver filaments generated by a low DC voltage.

Although other power supply schemes may be attempted to optimize growth and retraction characteristics, a low voltage DC power supply (in example, the power supply 115) providing up to, for example, 6 volts, is preferred. For example, pulse-width modulation (PWM) is commonly employed for electroplating to form a conformal thin metal film on a substrate. For example, FIGS. 4A-4C provide a comparison of a plurality of silver filaments 110 generated using a low voltage DC power supply and a plurality of silver filaments 110 generated using PWM of different duty cycles. In particular, FIG. 4A illustrates the generation of the plurality of silver filaments 110 when the power supply 115 provides 6 volts across the silver electrode 120A and the nickel electrode 120B. FIG. 4B illustrates the generation of the plurality of silver filaments 110 when a PWM with a duty cycle of 80% is applied across the silver electrode 120A and the nickel electrode 120B. FIG. 4C illustrates the generation of the plurality of silver filaments 110 when a PWM with a duty cycle of 50% is applied across the silver electrode 120A and the nickel electrode 120B.

As seen in FIGS. 4B and 4C, as the duty cycles decrease, for example, from 80% in FIG. 4B to 50% in FIG. 4C, the plurality of silver filaments 110 become more dispersive and narrow. The dispersing and narrowing of the plurality of silver filaments 110 seen in FIGS. 4B and 4C occurs because the growth of the plurality of silver filaments 110 relies on a drift-diffusion process. The drift force from the electric field E (as illustrated in FIG. 1A) drives the plurality of silver filaments 110 to grow in a straight manner. When PWM is applied, diffusion dominates causing the plurality of silver filaments 110 to produce more random shapes, which tend to spread across the entire chalcogenide solid electrolyte surface 125. In addition, as illustrated in FIG. 4B, at a duty cycle of 80%, the plurality of silver filaments 110 do not necessarily originate from the tip 135 of the nickel electrode 120B. Instead, as seen in FIG. 4B, some of the plurality of silver filaments 110 originate from a plurality of locations along the sides of the nickel electrode 120B. Additionally, although the total number of silver ions 130 to be consumed remains constant, the amount of silver ions 130 forming the main path of the plurality of silver filaments 110 from the tip 135 of the nickel electrode 120B decreases substantially. However, as illustrated in FIG. 4A, supplying a constant DC voltage facilitates a rapid and direct growth of the plurality of silver filaments 110, as opposed to the growth of the plurality of silver filaments 110 illustrated in FIGS. 4B and 2C.

Figure 5:
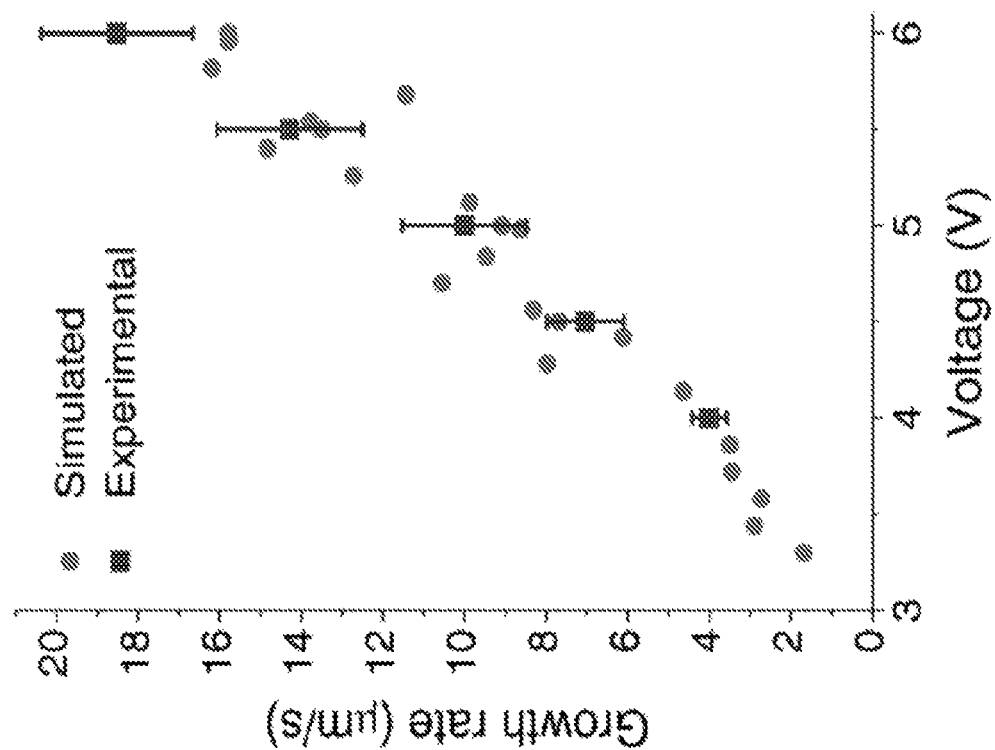
FIG. 5 is a graph illustrating the growth rate of the plurality of dendritic silver filaments as a function of an applied DC voltage.

FIG. 5 graphically illustrates the growth rate (in am/s) of the plurality of silver filaments 110 as a function of a DC voltage applied across the silver electrode 120A and the nickel electrode 120B. The graph 150 illustrated in FIG. 5 includes a simulated data set represented by round dots and an experimental data set represented by square dots. The simulated data set may be collected via a simulation using the Kinetic Monte Carlo drift-diffusion model. As seen in FIG. 5, the simulated data set shows finite fluctuations due to the random walk of the silver ions caused by diffusion and Brownian motion. The experimental data set may represent data collected during experiments. For example, as described in more detail below, the experiments may include collecting experimental data at each DC voltage four time.

As seen in FIG. 5, the growth rate of the plurality of silver filaments 110 increases exponentially as the DC voltage applied across the silver electrode 120A and the nickel electrode 120B increases. Similarly, as seen with the simulated data set in FIG. 5, the growth rate of the plurality of silver filaments 110 increases exponentially as the DC voltage applied across the silver electrode 120A and the nickel electrode 120B increases. Accordingly, the experimental data set matches well with the simulated data set. Additionally, as illustrated in the graph 150 of FIG. 5, a DC voltage of 6 volts approaches an upper limit of operation, as higher DC voltages may destroy (for example, via Joule heating) the chalcogenide solid electrolyte surface 125, the silver electrode 120A, the nickel electrode 120B, or a combination thereof.

The surface topography of a lotus surface includes one or more valleys. The one or more valleys included in the surface topography of a lotus surface may include confined air, which creates an air pocket. The air pockets prevent water from adhering to the lotus surface. Therefore, it is difficult to wet a lotus surface. In other words, water poorly adheres to a lotus surface because of the one or more air pockets confined in the one or more valleys of the surface topography of a lotus surface. Accordingly, this composite situation falls into the Cassie regime. Therefore, this heterogeneous wetting may be described using Equation (1):

$$\cos\theta = R_f \cos\theta_0 - f_{LA}(R_f \cos\theta_0 + 1) \quad (1)$$

where $\theta$ is the static contact angle (CA) for a rough surface, $\theta_0$ is the static CA for a smooth surface, $R_f$ is a roughness factor defined as a ratio of solid-liquid area to the projection of the solid-liquid area on a flat plane, and $f_{LA}$ is the fractional flat geometrical area of the liquid-air interface under a fluid droplet.

When water flows over one or more silver filaments, the silver filaments grow upwards. Therefore, it may be assumed that $f_{LA}$ is negligible when the one or more rough valleys of the surface topography are completely filled with water. Therefore, the surface topography is homogeneous. No air pockets exist in a homogeneous surface topography. Accordingly, the regime falls into Wenzel's regime and may be described using Wenzel's equation, Equation (2):

$$\cos\theta = R_f \cos\theta_0 \quad (2)$$

It should be noted that the CA for a rough surface, $\theta$, increases as the roughness factor, $R_f$, increases, provided the CA for a smooth surface, $\theta_0$, is greater than 90°. Therefore, the surface material (for example, silver) may be hydrophobic, even when the surface material does not form rough morphology. In some implementations, this may be adopted as a pre-required condition for Wenzel's equation (in example, Equation (2)). However, a high CA does not by itself ensure that the surface material is able to pin a fluid droplet because the adhesive force may be primarily attributed by contact angle hysteresis (CAH). Under the Cassie regime, CAH is calculated using Equation (3):

$$\cos\theta_{rec} - \cos\theta_{adv} = (1 - f_{LA})R_f(\cos\theta_{r0} - \cos\theta_{a0}) \quad (3)$$

Where $\theta_{a0}$ is an advancing angle and $\theta_{r0}$ is a receding angle for a smooth surface and $\theta_{adv}$ is an advancing angle and $\theta_{rec}$ is a receding angle for a rough surface.

For similar reasons as mentioned above, it may be presumed that $f_{LA}$ is equal to 0. Therefore, Equation (3) may be written as:

$$\cos\theta_{rec} - \cos\theta_{adv} = R_f(\cos\theta_{r0} - \cos\theta_{a0}) \quad (4)$$

The CA and CAH, listed in Table 1 below, were measured on a smooth silver surface, and used to estimate the CA and CAH on rough surfaces using Equation (2) and Equation (4).

TABLE 1

| Materials | CA [Deg] ± s.d. | Advancing angle [Deg] ± s.d. | Receding angle [Deg] ± s.d. | CAH [Deg] ± s.d. | $\cos\theta_{rec} - \cos\theta_{adv}$ |
|---|---|---|---|---|---|
| Rough silver | 94 ± 1 | 98 ± 2 | 24 ± 2 | 74 ± 3 | 1.05 |
| Smooth silver | 93 ± 1 | 114 ± 2 | 60 ± 2 | 54 ± 3 | 0.91 |
| Parylene | 87 ± 1 | 97 ± 2 | 64 ± 2 | 33 ± 3 | 0.56 |
| Chalcogenide | 69 ± 1 | 46 ± 2 | 22 ± 1 | 24 ± 1 | 0.23 |
| Silicon dioxide | 44 ± 1 | 39 ± 1 | 25 ± 1 | 14 ± 1 | 0.13 |

Figure 6:
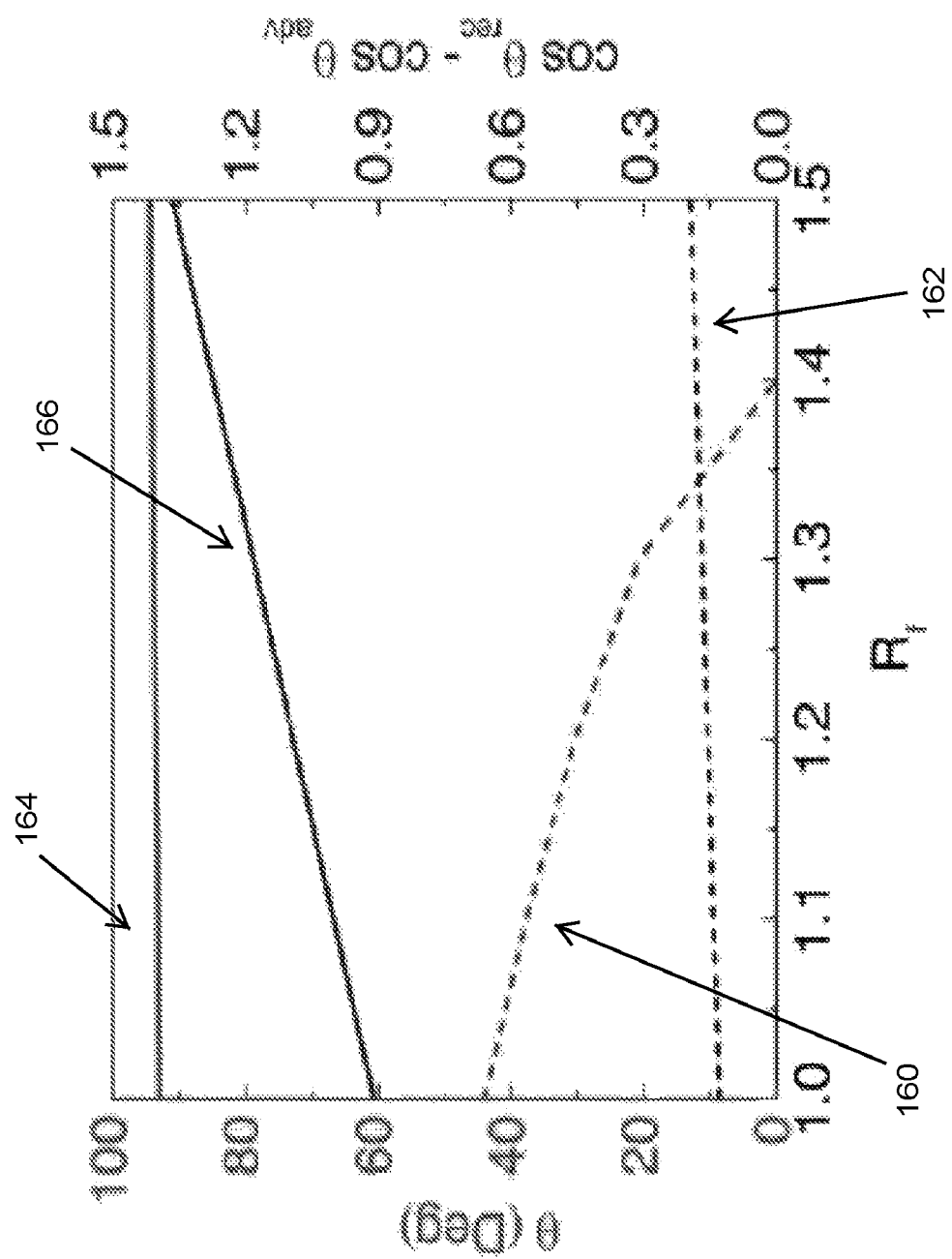
FIG. 6 is a graph illustrating the impact of roughness on a static contact angle and a static contact angle hysteresis of a silver surface and a silicon dioxide surface in simulation.
Figure 7A:
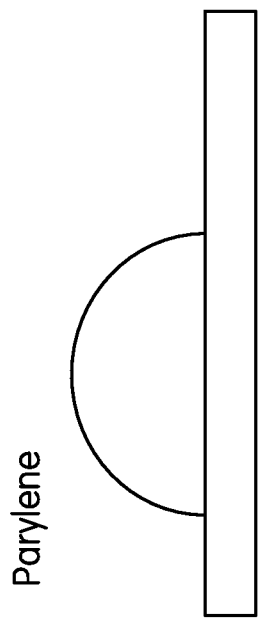
FIGS. 7A-7D are a schematic images of the static contact angle on a silver surface, a parylene surface, a chalcogenide surface, and a silicon dioxide surface representing the hydrophobicity of each material.
Figure 7C:
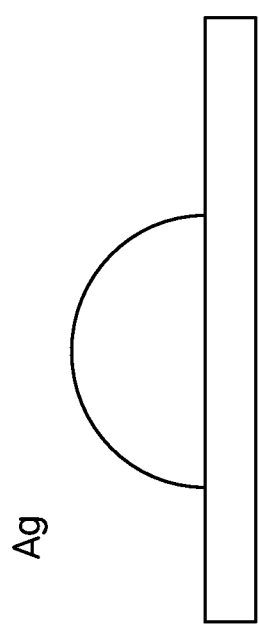
Figure 7B:
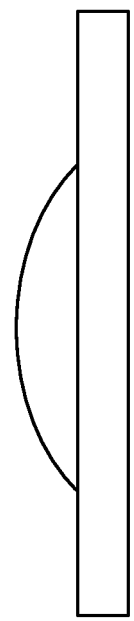
Figure 7D:
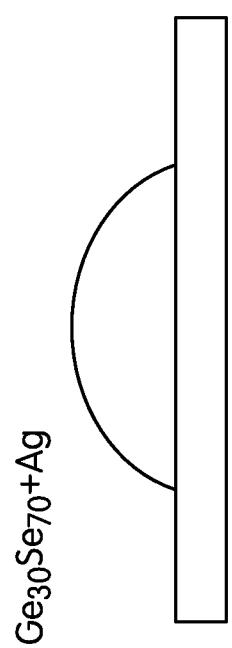

FIG. 6 graphically illustrates the impact of roughness on the CA and the CAH for both hydrophilic surfaces (represented with dotted lines) and hydrophobic surfaces (represented with solid lines). For example, as illustrated in FIG. 6, the CA for a hydrophilic surface is represented by line 160 and the CAH for a hydrophilic surface is represented by line 162. Additionally, the CA for a hydrophobic surface is represented by line 164 and the CAH for a hydrophobic surface is represented by line 166. As seen in FIG. 6, roughness promotes the CA and the CAH of hydrophobic surfaces while roughness lowers the CA of hydrophilic surfaces and moderately improves the CAH of hydrophilic surfaces.

In order to evaluate the effectiveness of hydrophobicity and roughness of the plurality of silver filaments 110, four surfaces may be prepared with different materials: (1) silver; (2) parylene; (3) silver-doped chalcogenide; and (4) silicon dioxide, as illustrated in FIGS. 7A-7D, respectively. The silver-doped chalcogenide surface and the silver surface may be deposited by, for example, thermal evaporation. The parylene surface may be deposited by, for example, standard monomer gas deposition in vacuum and the silicon dioxide surface may be deposited by, for example, e-beam evaporation.

A rame-hart Goniometer may be used to measure the CA, the advancing angle, and the receding angle of each of the four surfaces, as listed in Table 1. For example, in some implementations, water droplets of approximately 8 µL were gently dispensed on one or more of the surfaces using a micro-syringe. An advancing angle and a receding angle may be measured using, for example, an add/remove volume method. In particular, to measure an advancing angle, the water is stepped out of a micro-syringe (for example, as approximately 2 µL/step) to increase the volume of the water droplet. This may be repeated until the maximum CA, which is the advancing angle, is achieved. Furthermore, to measure a receding angle, the water may be stepped into the micro-syringe (for example, as approximately 2 µL/step) to retract back the volume of the water droplet. This may be repeated until the minimum CA, which is the receding angle, is achieved. The silver surface and the parylene surface are hydrophobic (93°±1 and 90°±1, respectively) whereas the chalcogenide surface (69°±1) and the silicon dioxide surface (44°±1) are both hydrophilic, while none of the four materials have a high CAH (<54°).

As mentioned above, when the plurality of silver filaments 110 grow, the plurality of silver filaments 110 may reside under the thin parylene film 128. Accordingly, when the plurality of silver filaments 110 grow and retract underneath the parylene film 128, the topography of the plurality of silver filaments 110 may be projected through the parylene film 128. The projection of the topography of the plurality of silver filaments 110 through the parylene film 128 may generate significant roughness above the surface of the parylene film 128. In some implementations, the maximum height of the roughness above the surface of the parylene film 128 was measured to be approximately 400 nm. The roughness generated by the protruded topography of the plurality of silver filaments 110 is independent of the patch materials (for example, the parylene film 128) positioned above the plurality of silver filaments 110. The roughness factors, $R_f$, on the surface of the parylene film 128, the silicon dioxide surface, and the chalcogenide solid electrolyte surface 125 may be estimated as approximately 1.19, 1.96, and 1.54, respectively. Accordingly, no significant variation in the roughness factor was observed among the parylene film 128, the silicon dioxide surface, and the chalcogenide solid electrolyte surface 125.

However, not every patching material allows the microfluidic valve device 100 to regulate the flow of fluid in the microfluidic channel 105. For example, a microfluidic valve device 100 without any patch material and a microfluidic valve device 100 with a parylene patch (in example, the parylene film 128) may stop the flow of fluid in the microfluidic channel 105. However, a microfluidic valve device 100 with a silicon dioxide patch may fail to stop the flow of fluid in the microfluidic channel 105 regardless of the roughness generated by the protruded topography of the plurality of silver filaments 110. Therefore, in some implementations, hydrophobicity is an important feature for the controlled regulation of the flow of fluid in the microfluidic channel 105. However, merely having a hydrophobic surface may not provide successful regulation of the flow of fluid in the microfluidic channel 105 either. Without the growth of the plurality of silver filaments 110, a microfluidic valve device 100 with the parylene film 128 may not be able to stop the flow of fluid through the microfluidic channel 105. Such an unrestricted flow of fluid in the microfluidic channel 105 results from the fact that a hydrophobic surface by itself may not provide a high enough CAH without substantial roughness. In other words, the adhesive force may be too weak to hinder the flow of fluid in the microfluidic channel 105, regardless of the CA.

Figure 8B:
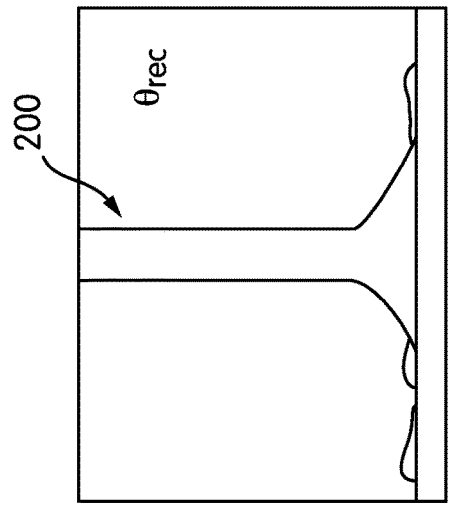
FIGS. 8A-8B are schematic diagrams of the static contact angle hysteresis on a rough silver surface representing an adhesive force on a water droplet.
Figure 8D:
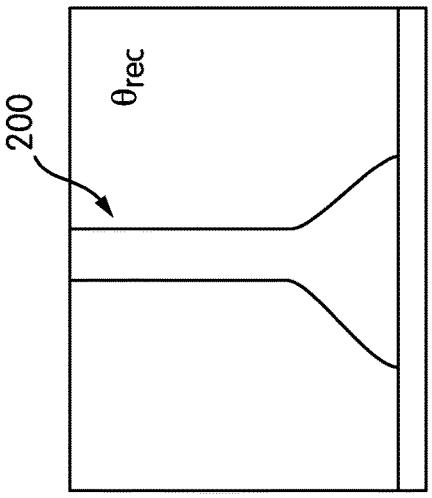
FIGS. 8C-8D are schematic diagrams of the static contact angle hysteresis on a smooth silver surface representing an adhesive force on a water droplet.
Figure 8A:
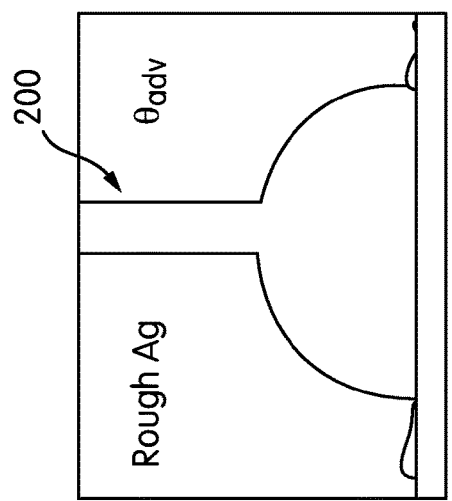
Figure 8C:
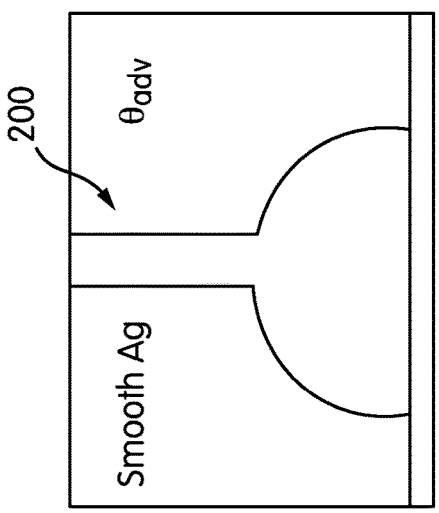

For example, FIGS. 8A-8D illustrate the impact of the roughness of a surface material. FIGS. 8A and 8B illustrate an advancing angle and a receding angle, respectively, on a rough silver surface. FIGS. 8C and 8D illustrate an advancing angle and a receding angle, respectively, on a smooth silver surface. In particular, FIGS. 8A-8D illustrate carbon nanotubes (CNTs) 200, having lengths of approximately 5-15 μm and diameters of approximately 60-100 nm, that are randomly dispersed on a smooth glass surface. A thin thermally-evaporated silver film (for example, approximately 100 nm thick) is deposited to cover the smooth glass surface. The roughness factor of the smooth glass surface may be estimated as 1.2. As listed in Table 1 above, the CAH on the rough silver surface illustrated in FIGS. 8A and 8B is 20% larger than the CAH on the smooth silver surface illustrated in FIGS. 8C and 8D. This suggests the roughness on hydrophobic surfaces has an impact on the adhesive force to stop the flow of fluid in the microfluidic channel 105. This strongly suggests that both the hydrophobicity of the interface and the roughness caused by filaments contribute to regulating the flow of fluid in the microfluidic channel 105.

Accordingly, the roughness associated with the protruded topography of the plurality of silver filaments 110 may effectively enhance the CA and the CAH to regulate the flow of fluid in the microfluidic channel 150. However, the roughness associated with the protruded topography of the plurality of silver filaments 110 may allow diffusion of silver ions into the fluid samples, which may contaminate the fluid samples. Accordingly, the parylene film 128 physically isolates the roughness associated with the protruded topography of the plurality of silver filaments 110 from the fluid samples. The effluents of a microfluidic valve device 100 with the parylene film 128 and the effluents of a microfluidic valve device 100 without the parylene film 128 may be collected (for example, from an outlet of the microfluidic channel 105) and separately analyzed by, for example, an inductive coupled plasma optical emission spectrometer (ICP-OES, Themo iCAP6300). The effluents of the microfluidic valve device may be collected and analyzed at an emission wavelength of approximately 238 nm. The spectrometer may be calibrated using ionic silver solutions with the concentrations of 1, 10, 100 and 1000 ppb. In some implementations, 1 ppb was found to be the detection limit of the spectrometer. The concentration below 1 ppb was detected as an invalid reading. In some implementations, the silver concentrations of a microfluidic valve device 100 with the parylene film 128 showed a reading of 6.4 ppb while the silver concentrations of a microfluidic valve device 100 without the parylene film 128 showed undetectable readings.

Figure 9:
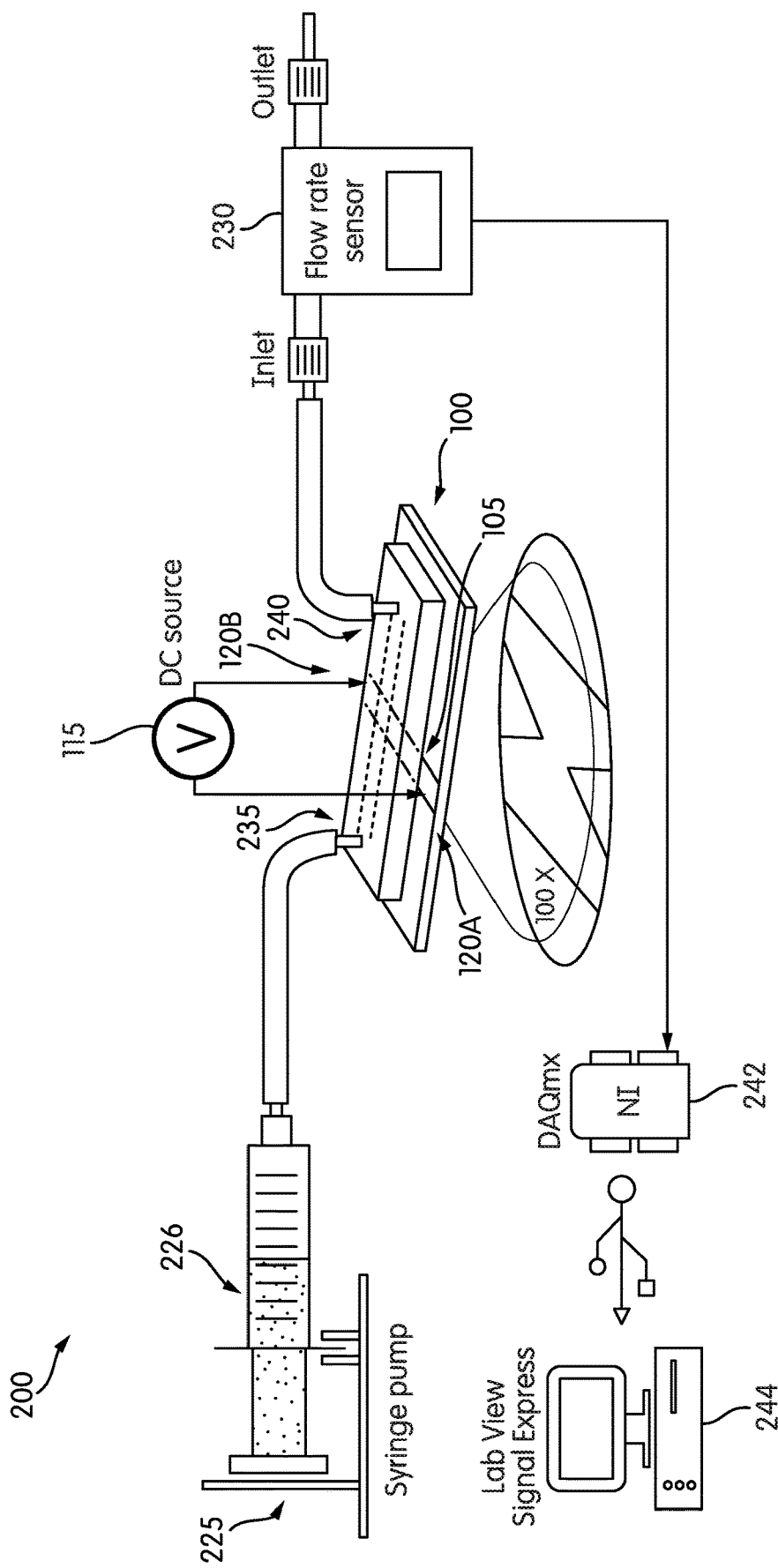
FIG. 9 is a schematic diagram of an evaluation system.
Figure 10:
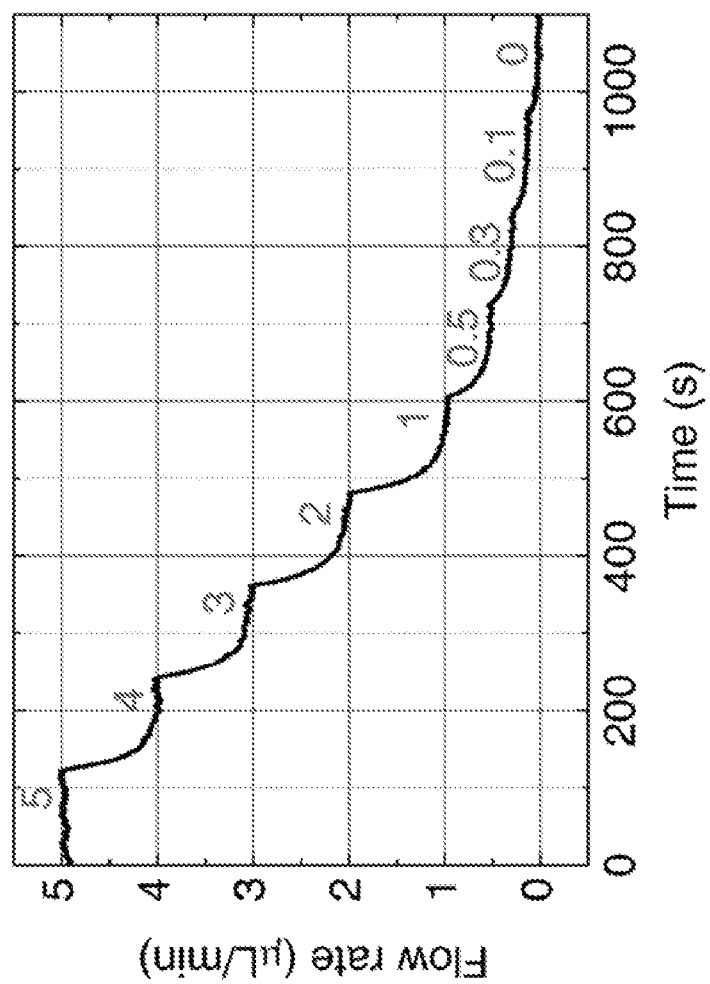
FIG. 10 is a graph illustrating a set of known flow rates used for calibrating the evaluation system of FIG. 9.

FIG. 9 illustrates an evaluation system 220 for evaluating the effectiveness of the microfluidic valve device 100 in accordance with one embodiment. The evaluation system 220 illustrated in FIG. 9 may be calibrated using a series of known flow rates. For example, FIG. 10 graphically illustrates an exemplary series of known flow rates that may be used to calibrate the evaluation system 220 illustrated in FIG. 9. As illustrated in FIG. 9, the evaluation system 220 includes a syringe pump 225, a flow rate sensor 230 (for example, a Honeywell X119117-AW), and the microfluidic valve device 100.

In some embodiments, the syringe pump 225 (Harvard Apparatus PHD 2000) drives a glass syringe 226 to inject distilled water into an inlet 235 of the microfluidic channel 105. In particular, the syringe pump 225 may be used to generate the series of known flow rates (for example, the series of known flow rates illustrated in FIG. 10) at the inlet 235 of the microfluidic valve device 100. As illustrated in FIG. 9, the flow rate sensor 230 is positioned at an outlet 240 of the microfluidic valve device 100. The flow rate sensor 230 may be configured to measure flow rates at the outlet 240 of the microfluidic valve device 100 (in example, the microfluidic channel 105). The flow rates may be continuously collected by a data acquisition system 242, such as DAQmx (NI USB-6216). In some embodiments, an image of the microfluidic channel 105 is magnified 100 times by an optical microscope (for example, a Nikon Eclipse TE2000-U) and displayed simultaneously on a computing device 244 using, for example, a Micro-Manager software (Vale Lab, UCSF). As described in greater detail below, to further visualize the flow of fluid in the microfluidic channel 105, microspheres (average diameter of 5 μm, 1% solids, Phosphorex, Inc.), diluted 50 times to 3000/μL, may be added to the distilled water.

The flow rates measured at the outlet 240 of the microfluidic valve device 100 may respond immediately after the input flow rate generated by the syringe pump 225 is changed. However, when the input flow rate is changed, the flow rate measurement at the inlet 235 of the microfluidic valve device 100 (in example, where the input flow rate is generated) may experience a delay (for example, approximately 60 seconds) before the measurement at the inlet 235 of the microfluidic valve device 100 is stabilized. For example, when the input flow rate is changed, it may take approximately 60 seconds before the change in the input flow rate is reflected in the flow rate measured at the inlet 235 of the microfluidic valve device 100. The delay in measurement stabilization at the inlet 235 of the microfluidic valve device 100 may be from an impedance associated with the microfluidic tubing of the evaluation system 220. It should be noted that, for a first-ordered system, the normalized unforced response of the first-ordered system may be described as $y(t)/y(0)=e^{-t/\tau}$, which may estimate a time constant of approximately 15 seconds.

Figure 11:
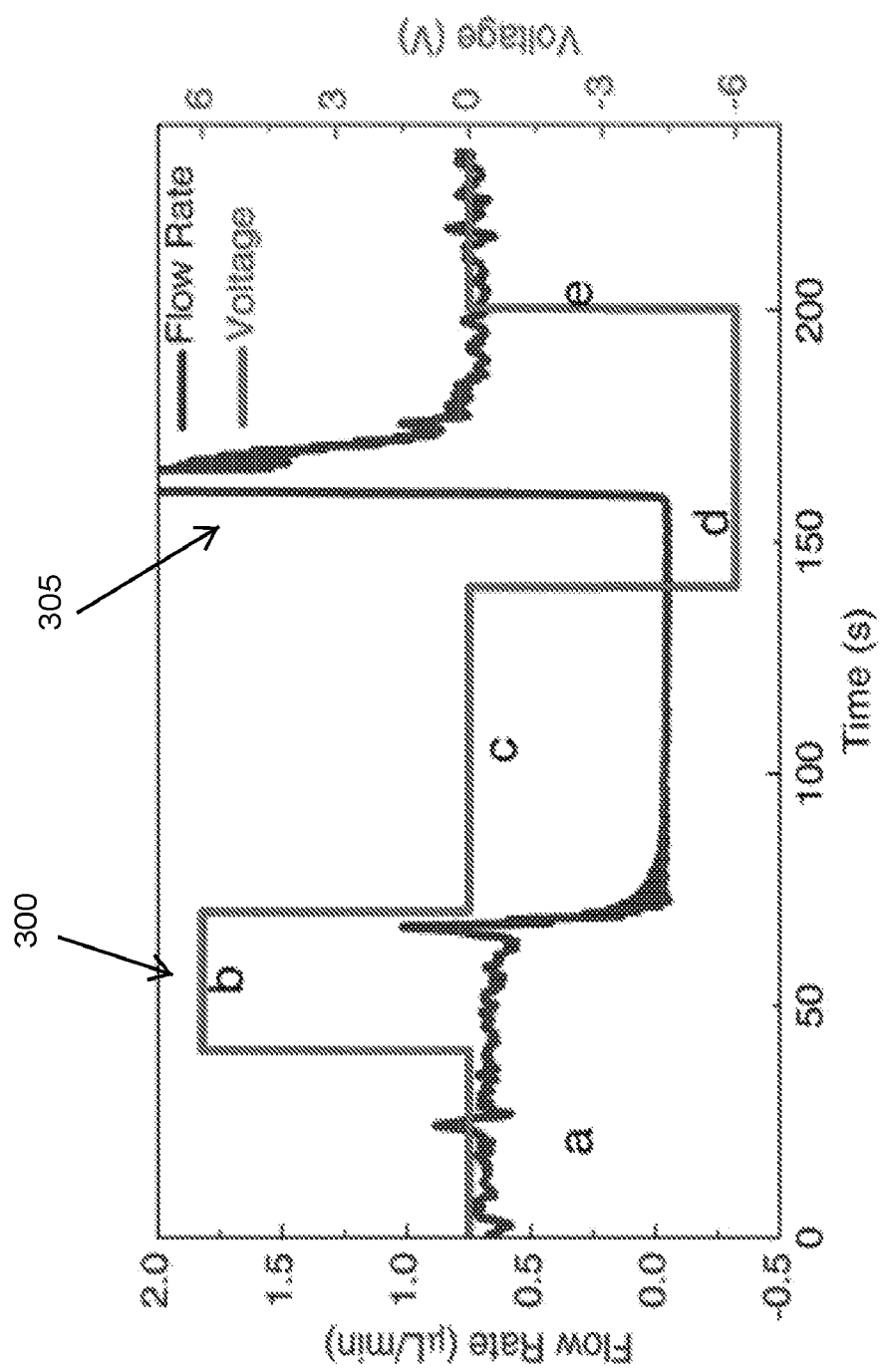
FIG. 11 is a graph illustrating a series of on/off valve operations of the microfluidic valve device and a corresponding flow rate measurement.

FIG. 11 graphically illustrates a series of on/off valve operations (represented by line 300) and a plurality of corresponding flow rate measurements (represented by line 305). In operation, the microfluidic valve device 100 is turned on when a DC voltage is applied via the power supply 115 across the silver electrode 120A and the nickel electrode 120B. Conversely, the microfluidic valve device 100 is turned off when no DC voltage is applied via the power supply 115 across the silver electrode 120A and the nickel electrode 120B. As illustrated in FIG. 11, the series of on/off valve operations are associated with the a plurality of phases, such as a first phase A, a second phase B, a third phase C, a fourth phase D, and a fifth phase E. As illustrated in FIG. 11, the first phase A, the third phase C, and the fifth phase E represent when the microfluidic valve device 100 is turned off (in example, no DC voltage is applied via the power supply 115). As illustrated in FIG. 11, the second phase B and the fourth phase D represent when the microfluidic valve device 100 is turned on. In particular, during the second phase B, the power supply 115 applies a positive DC voltage of 6 volts across the silver electrode 120A and the nickel electrode 120B of the microfluidic valve device 100. During the fourth phase D, the power supply 115 applies a negative DC voltage of −6 volts across the silver electrode 120A and the nickel electrode 120B of the microfluidic valve device 100.

As illustrated in FIG. 11, when the power supply 115 applies a positive DC voltage of 6 volts across the silver electrode 120A and the nickel electrode 120B of the microfluidic valve device 100 (in example, during the second phase B), the plurality of silver filaments 110 grow out from the tip 135 of the nickel electrode 120B. As seen in FIG. 11, the plurality of the silver filaments 110 traverse the microfluidic channel 105 in approximately 25 seconds. The plurality of silver filaments 110 continue to grow toward the silver electrode 120A and reach the tip 140 of the silver electrode 120A in approximately 5 seconds. Once the plurality of silver filaments 110 reach the tip 140 of the silver electrode 120A, the power supply 115 is turned off to prevent high current flow and possible consequential damage to the silver electrode 120A and the nickel electrode 120B. As soon as the plurality of the silver filaments 110 traverse the microfluidic channel 105, the flow rate undergoes an intense oscillation, as seen in FIG. 11. However, as illustrated in FIG. 11, the flow rate ultimately settles down to zero in approximately 15 seconds. This demonstrates that the flow of fluid through the microfluidic channel 150 may be shut off by the microfluidic valve device 100. The approximate response time of 15 seconds may be verified by the calibration of the microfluidic valve device 100, as discussed above. Since the plurality of the silver filaments 110 are non-volatile, no static power is required to retain the on/off states of the microfluidic valve device 100.

Furthermore, as illustrated in FIG. 11, when the power supply 115 applies a negative DC voltage of −6 volts across the silver electrode 120A and the nickel electrode 120B of the microfluidic valve device 100 (in example, during the fourth phase D), the microfluidic valve device 100 is switched on. In some embodiments, a 10 kΩ resistor is connected in series to limit current. In response to the application of −6 volts DC, the plurality of silver filaments 110 retract from the tip 140 of the silver electrode 120A across the microfluidic channel 105 in approximately 30 seconds. Ultimately, the plurality of silver filaments 110 vanish near the tip 135 of the nickel electrode 120B after approximately 30 additional seconds. Accordingly, during the last approximately 30 seconds of the retraction process, the retraction process itself has little impact on the flow of fluid in the microfluidic channel 105. The flow rate starts to increase in approximately 20 seconds, approximately 10 seconds before the plurality of silver filaments 110 fully retract out of the microfluidic channel 105. As seen in FIG. 11, the flow rate may initially experience intense oscillations. However, the flow rate eventually returns to a steady state flow in approximately 15 seconds, as seen in FIG. 11.

Figure 12:
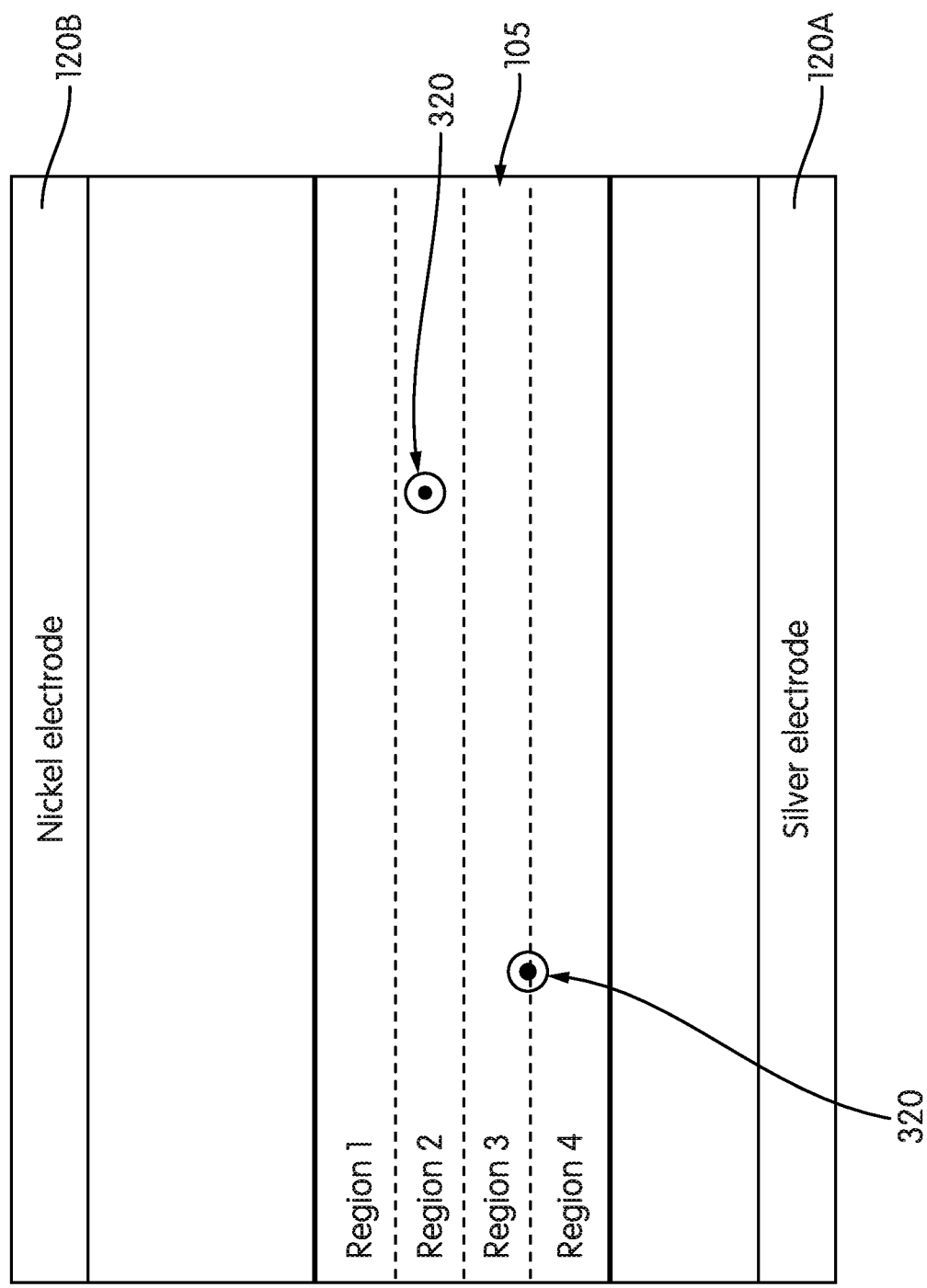
FIG. 12 is a schematic diagram illustration the visualization of a microfluidic flow of a fluid through a microfluidic channel via monitoring one or more microspheres inside the fluid.

In addition to monitoring the flow rate through flow rate measurements, as illustrated in FIG. 11, the flow rate may be simultaneously visualized through the monitoring of one or more microspheres 320, as illustrated in FIG. 12. The microspheres 320 illustrated in FIG. 12 may be approximately 5 m in diameter and positioned inside the fluid of the microfluidic valve device 100. The microspheres 320 may move rapidly, for example, at about 1 mm/s, inside the microfluidic channel 105. As the flow rate decreases by activating the microfluidic valve device 100 via the growth of the plurality of silver filaments 110, the movement of the microspheres 320 also decreases. When the plurality of silver filaments 110 traverses the microfluidic channel 105 and the microfluidic valve device 100 is shut off, the microspheres 320 float in the fluid in the microfluidic channel 105. However, once the microfluidic valve device 100 reopens the microfluidic channel 105 (in example, the microfluidic valve device 100 is repowered) and the flow of fluid resumes, the microspheres 320 simultaneously resume movement along the microfluidic channel 105.

Figure 13:
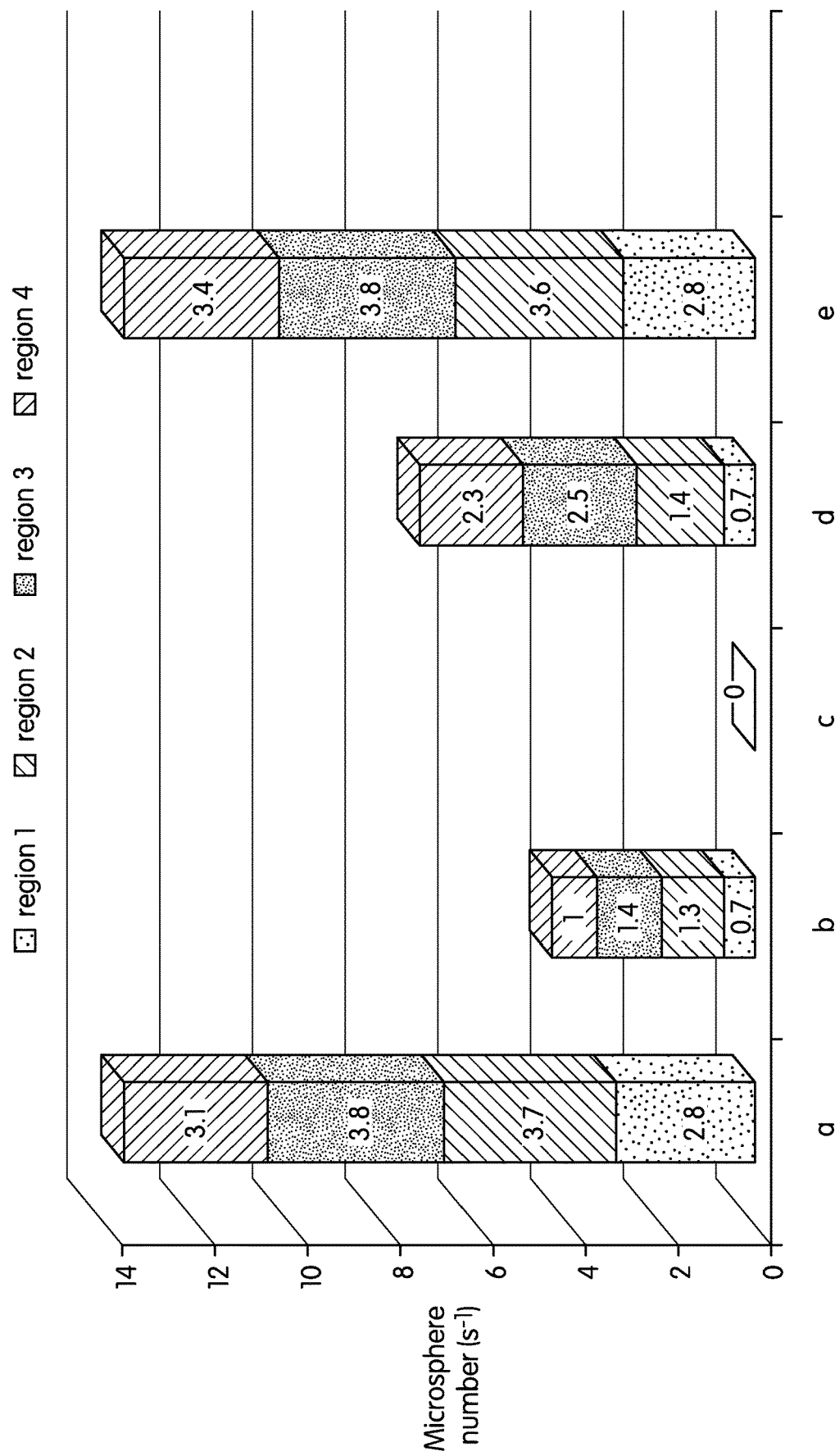
FIG. 13 is a graph illustrating the counts of microspheres in an individual region of the microfluidic channel at different times corresponding to the series of on/off valve operations of FIG. 11.

As illustrated in FIG. 12, the microfluidic channel 105 may be divided into four regions, for example, Region 1, Region 2, Region 3, and Region 4, along the width of the microfluidic channel 105. As seen in FIG. 12, Region 1 may be positioned closest to the nickel electrode 120B, Region 4 may be positioned closest to the silver electrode 120A, and Region 2 and Region 3 may be positioned between Region 1 and Region 4, with Region 2 closer to the nickel electrode 120B than Region 3. As illustrated in FIG. 13, the number of microspheres 320 within Region 1, Region 2, Region 3, and Region 4 may be counted in different phases. The different phases used to count the number of microspheres 320 may correspond to the phases discussed above with respect to FIG. 11.

The microspheres 320 may prefer specific regions within the microfluidic channel 105. Additionally, the number of microspheres 320 within each region may be dependent on the growth and retraction of the plurality of silver filaments 110. For example, Region 1 and Region 4 may have fewer and slower microspheres 320 than Region 2 and Region 3 as the pressure-driven flow in a microfluidic channel 105 results in a convex profile. However, Region 1 may have fewer and slower microspheres 320 than Region 4 when, for example, the plurality of silver filaments 110 are in the process of growing and retracting (in example, the microfluidic valve device is opening and closing). Such a trend may be apparent during the reopening period of the microfluidic channel 105. The trend may match the presence of partial filaments. A region where the plurality of silver filaments 110 exist may have fewer and slower microspheres 320 than a region where the plurality of silver filaments 110 have retracted or a region where the plurality of silver filaments 110 have not yet reached. Accordingly, the behaviors of the microspheres 320 reflect the flow rate of the fluid through the microfluidic channel 105. This observation is consistent with the filament growth-induced hydrodynamic changes. The spatial regional variation in flow rate may be explained by regionally diverse roughness, which may impact the movement of the microspheres 320 in different regions of the microfluidic channel 105.

Accordingly, the electrodeposition of metal with nanoscale roughness on the surface of a solid electrolyte (in example, the chalcogenide solid electrolyte surface 125) may be used to regulate the flow of fluid in a microfluidic channel (in example, the microfluidic channel 105 of the microfluidic valve device 100). Furthermore, this mimics the transition from the lotus effect to the petal effect by inducing nano-scale roughness of the plurality of silver filaments 110. Dynamic changes on both the CA and the CAH via nanoscale roughness may impact the regulation of the flow of fluid in the microfluidic channel 105 that is approximately 25 µm tall. As described in greater detail above, the microfluidic valve device 100 may be evaluated by flow rate measurements, by flow rate visualization by suspended microspheres 320 in the fluid, or by a combination thereof.

Figure 14C:
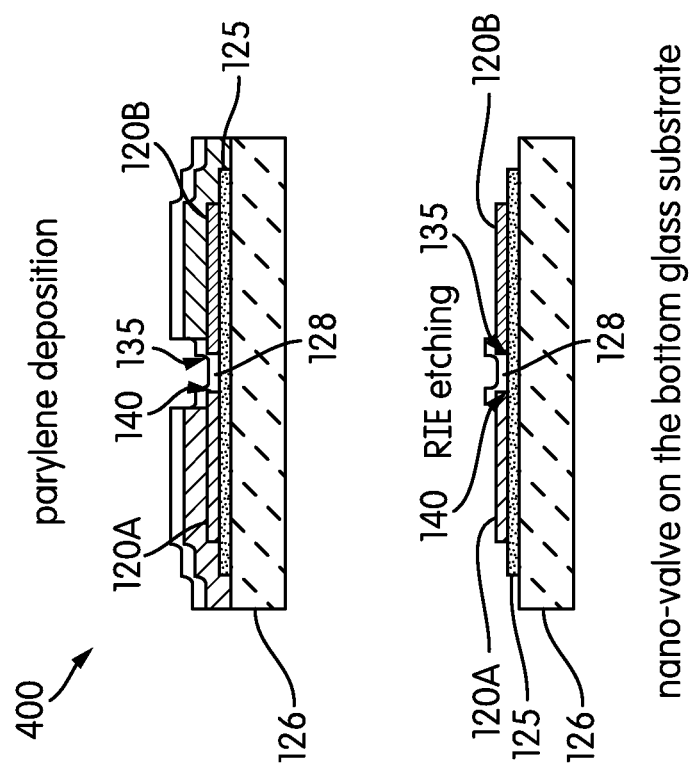

FIGS. 14A-14E show a step by step fabrication process 400 of the microfluidic valve device 100 on the glass substrate 126. As illustrated in FIG. 14A, the fabrication process 400 starts with a 120 nm chalcogenide ($Ge_{30}Se_{70}$) film and a 30 nm silver film. The chalcogenide film and the silver film are successively deposited on the isopropyl alcohol (IPA)-cleaned glass substrate 126 by, for example, a thermal evaporator. The glass substrate 126 is exposed to UV light (2.3 mW/cm$^2$) for 20 minutes. The exposure to UV light allows the silver film to be completely photodoped into the chalcogenide film, forming the chalcogenide solid electrolyte surface 125. The total thickness of the final film (in example, the chalcogenide solid electrolyte surface 125) is approximately 140 nm thick. As illustrated in FIG. 14B, the fabrication process 400 also includes two chalcogenide pads 402 that are patterned using lift-off. On the top of the chalcogenide pads 402, the nickel electrode 120B and the silver electrode 120A (each approximately 80 nm think) are deposited in sequence by, for example, sputtering and thermal evaporation. The nickel electrode 120B and the silver electrode 120A are also patterned via lift-off. Both the nickel electrode 120B and the silver electrode 120A have tips (in example, the tip 135 and the tip 140, respectively) facing each other in order to generate a stronger and more directional electric field E which may accelerate the growth of the plurality of silver filaments 110 across the microfluidic channel 105. The pad has a narrow neck between the tip 140 of the silver electrode 120A and the tip 135 of the nickel electrode 120B, which is also designed to confine the electric field E and to guide the growth of the plurality of silver filaments 110. As illustrated in FIG. 14C, the fabrication process 400 also includes depositing the parylene film 128. The parylene film 128 (approximately 200 nm think), which is deposited by standard monomer gas deposition in vacuum and then patterned through reactive-ion etching (RIE), is applied to cover the chalcogenide solid electrolyte surface 125 where the fluid passes over (in example, the microfluidic channel 105). Considering the potential biological application, the parylene film 128 may isolate the bio-sample in the microfluidic channel 105 from the contamination of silver or silver ions.

As illustrated in FIG. 14D, the fabrication process 400 includes the fabrication of the top PDMS enclosure 127. For the top PDMS enclosure 127, a silicon wafer master 404 is patterned through deep reactive-ion etching (DRIE) to create the inverse topography of the microfluidic channel 105 with the dimensions of 250 m in width and 25 µm in depth. A PDMS monomer is mixed with curing agent (Dow Corning Corp.) and degassed in a vacuum, and then poured onto the silicon wafer master 404. After two hours of baking on a hotplate at 120° C., the solidified top PDMS enclosure 127 becomes unmolded. Two holes, an inlet and an outlet, are drilled at each end of the microfluidic channel 105. The top PDMS enclosure 127 is exposed to an oxygen plasma cleaner at 200 W for 1 minute so as to activate the PDMS surface to be hydrophilic, which affords strong bonding with the bottom substrate, as illustrated in FIG. 14E. Distilled water is driven into the microfluidic channel 105 to fill the microfluidic channel 105 immediately after the bonding. The distilled water flows past the tip 140 of the silver electrode 120A and the tip 135 of the nickel electrode 120B.

Thus the invention provides, among other things, a low-voltage microfluidic valve that employs a reversible petal effect for regulating the flow of fluid. Various features and advantages of the invention are set forth in the following claim and in the accompanying drawings.

What is claimed is:

1. A low-voltage microfluidic valve device for regulating the flow of a fluid, the device comprising:
   a substrate;
   a plurality of electrodes positioned on the substrate;
   a microfluidic channel formed between the plurality of electrodes;
   a nano-textured dendritic metallic filament configured to grow and retract between the plurality of electrodes in response to a voltage applied to the plurality of electrodes;
   a parylene membrane covering the microfluidic channel and configured to alter shape in response to the growth of the nano-textured dendritic metallic filament; and
   the microfluidic channel configured to allow fluid flow over the parylene membrane, wherein the fluid flow is selectively interrupted by the parylene membrane when the shape of the parylene membrane is altered by the growth of the nanotextured dendritic metallic filament.

2. The low-voltage microfluidic valve device of claim 1, wherein the parylene membrane is configured to isolate the fluid from an underlying metal and solid electrolyte.

3. The low-voltage microfluidic valve device of claim 2, wherein the underlying metal and solid electrolyte is constructed of chalcogenide.

4. The low-voltage microfluidic valve device of claim 1, further comprising a power supply for providing the voltage to the nano-textured dendritic metallic filament.

5. The low-voltage microfluidic valve device of claim 4, wherein the power supply is a direct current power supply.

6. The low-voltage microfluidic valve device of claim 1, wherein the growth and retraction of the nano-textured dendritic metallic filament is based on a reversible petal effect that controls the fluid flow.

7. The low-voltage microfluidic valve device of claim 1, wherein the nano-textured dentritic metallic filament is configured to grow in response to a positive direct current voltage and wherein the nano-textured dendritic metallic filament is configured to retract in response to a negative direct current voltage.

8. The low-voltage microfluidic valve device of claim 1, further comprising a first electrode and a second electrode opposite the first electrode, and wherein the nano-textured dendritic metallic filament is configured to grow and retract in response to a voltage applied across the first electrode and the second electrode.

9. The low-voltage microfluidic valve device of claim 8, wherein the first electrode is constructed of silver and the second electrode is constructed of nickel, and wherein the nanotextured dendritic metallic filament is configured to grow and retract from the second electrode in response to a voltage applied across the first electrode and the second electrode.

10. The low-voltage microfluidic valve device of claim 1, wherein the microfluidic channel is enclosed by the parylene membrane and a polydimethylsiloxane (PDMS) membrane and wherein the microfluidic channel is 25 µm in depth.

* * * * *